US006793068B2

United States Patent
Shefet et al.

(10) Patent No.: US 6,793,068 B2
(45) Date of Patent: Sep. 21, 2004

(54) FOOD TRANSPORT ROUTING SYSTEMS, DEVICES, AND GUIDES FOR FOOD PROCESSING SYSTEMS AND RELATED METHODS

(75) Inventors: Sarid M. Shefet, Cary, NC (US); John Michael Phillips, State Road, NC (US); Frank Michael Horvath, Jr., Harmony, NC (US); Lawrence Alan Chandler, Raleigh, NC (US); Richard Rodeheaver Hawkins, Raleigh, NC (US); Larry Jones, Garner, NC (US)

(73) Assignee: ConAgra Foods, Inc., Edina, MN (US)

( * ) Notice: Subject to any disclaimer, the term of this patent is extended or adjusted under 35 U.S.C. 154(b) by 46 days.

(21) Appl. No.: 10/170,887

(22) Filed: Jun. 13, 2002

(65) Prior Publication Data

US 2003/0146067 A1 Aug. 7, 2003

Related U.S. Application Data

(60) Provisional application No. 60/354,097, filed on Feb. 4, 2002.

(51) Int. Cl.[7] .............................................. B65G 37/00
(52) U.S. Cl. ...................... 198/778; 198/458; 198/442; 426/315; 99/443 C
(58) Field of Search .............................. 198/347.4, 458, 198/442, 778; 426/315; 99/443 C

(56) References Cited

U.S. PATENT DOCUMENTS

| 740,981 A | * 10/1903 | Jennings ...................... 99/366 |
| 2,697,850 A | 12/1954 | Cross |
| 2,873,020 A | * 2/1959 | Kay ........................ 198/347.1 |
| 3,022,745 A | 2/1962 | Roberts |
| 4,079,666 A | 3/1978 | Plemons et al. ............... 99/355 |
| 4,129,923 A | 12/1978 | Hoegger |
| 4,565,282 A | 1/1986 | Olsson et al. ................ 198/778 |
| 4,582,047 A | 4/1986 | Williams ...................... 126/369 |
| 4,612,684 A | 9/1986 | Kollross |
| 4,644,607 A | 2/1987 | Sziede |
| 4,726,766 A | 2/1988 | Stewart et al. |
| 4,761,854 A | 8/1988 | Schnell et al. |
| 4,766,645 A | 8/1988 | Lamartino et al. ............. 17/49 |
| 4,771,876 A | * 9/1988 | Bandixen ..................... 198/367 |
| 4,880,105 A | 11/1989 | Kasai et al. |
| 4,890,394 A | 1/1990 | Troetscher |
| 4,899,866 A | * 2/1990 | Colamussi ............... 198/418.1 |
| 4,899,886 A | 2/1990 | Johansen |

(List continued on next page.)

FOREIGN PATENT DOCUMENTS

FR     2.088.622     4/1970

OTHER PUBLICATIONS

PCT International Search Report, International App. No. PCT/US03/2986 filed Jan. 31, 2003, received Aug. 22, 2003.

(List continued on next page.)

Primary Examiner—Christopher P. Ellis
Assistant Examiner—Mark A. Deuble
(74) Attorney, Agent, or Firm—Myers Bigel Sibley & Sajovec PA

(57) ABSTRACT

Commercial production transport systems, mechanisms, and guides for food processing are configured so as to automate food transport. The system can direct food to travel serially over side-by-side predetermined travel lanes using one or more of a pick-up mechanism and/or router guide channels to pick-up and/or laterally translate the food product form the first travel lane to the second travel lane so that it travels greater than one, and typically a plurality, of revolutions about a tier or level in a vertically stacked food processing unit before moving to the next tier. Associated methods redirect and/or laterally translate food being transported in an automated food processing system.

24 Claims, 15 Drawing Sheets

U.S. PATENT DOCUMENTS

| | | | | |
|---|---|---|---|---|
| 4,997,365 | A | 3/1991 | Lanham | 432/121 |
| 5,049,108 | A | 9/1991 | Staudenrausch | 452/48 |
| 5,078,120 | A | 1/1992 | Hwang | 126/21 A |
| 5,098,332 | A | 3/1992 | Handel | |
| 5,277,301 | A | 1/1994 | Fenty | 198/778 |
| 5,354,229 | A | 10/1994 | Markwardt et al. | |
| 5,354,230 | A | 10/1994 | McFarlane et al. | |
| 5,480,346 | A | 1/1996 | Kasai et al. | 452/47 |
| RE35,259 | E | 6/1996 | Williams | 126/369 |
| 5,788,563 | A | 8/1998 | Nakamura et al. | 452/47 |
| 5,830,050 | A | 11/1998 | Nakamura et al. | |
| 5,942,265 | A | 8/1999 | Roberds et al. | 426/59 |
| 6,066,035 | A | 5/2000 | Hergott et al. | |
| 6,277,018 | B1 | 8/2001 | Cody et al. | |
| 6,468,143 | B1 | 10/2002 | White et al. | |
| 6,523,462 | B1 | 9/2003 | Johnson | |
| 2002/0197363 | A1 * | 12/2002 | Shefet et al. | 426/315 |
| 2003/0148724 | A1 | 8/2003 | Shefet et al. | |

OTHER PUBLICATIONS

Article, "Continuous Process Systems", Alkar, http://www.alkar.com (date unavailable; believe to be dated before Mar. 1, 2002) pp. 1–3.

Article, "Batch Oven", Alkar, http://www.alkar.com (dated unavailable; believed to be dated before Mar. 1, 2002) pp. 1–3.

Brochure, "Fessmann Smoking Cooking CoolingTurbomat 7000: Industrial Smoking and Cooking", Fessman Group (date unavailable; believed to be dated before Mar. 1, 2002) pp. 1–8.

Brochure, "Fessmann Transfer 4000: Continuous Smoking, Cooking and Cooling", Fessman Group (date unavailable believed to be dated before Mar. 1, 2002) pp. 1–9.

Pictures of the inside of a conventional prior art oven from Alkar.

* cited by examiner

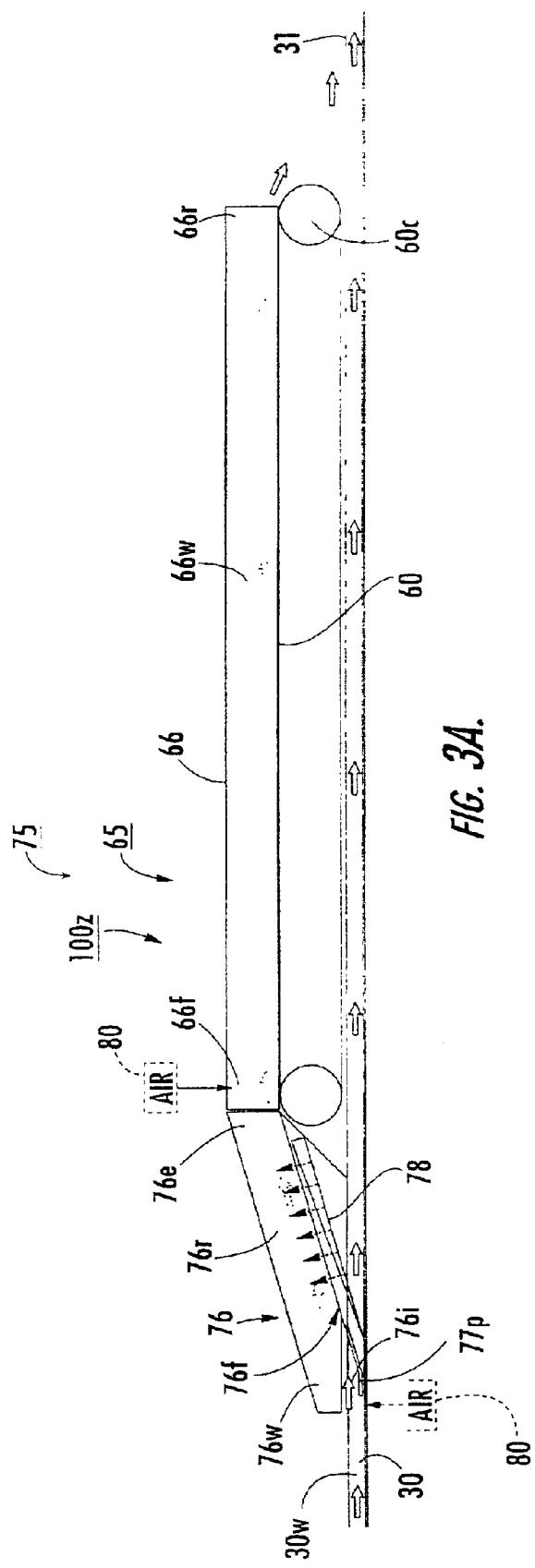

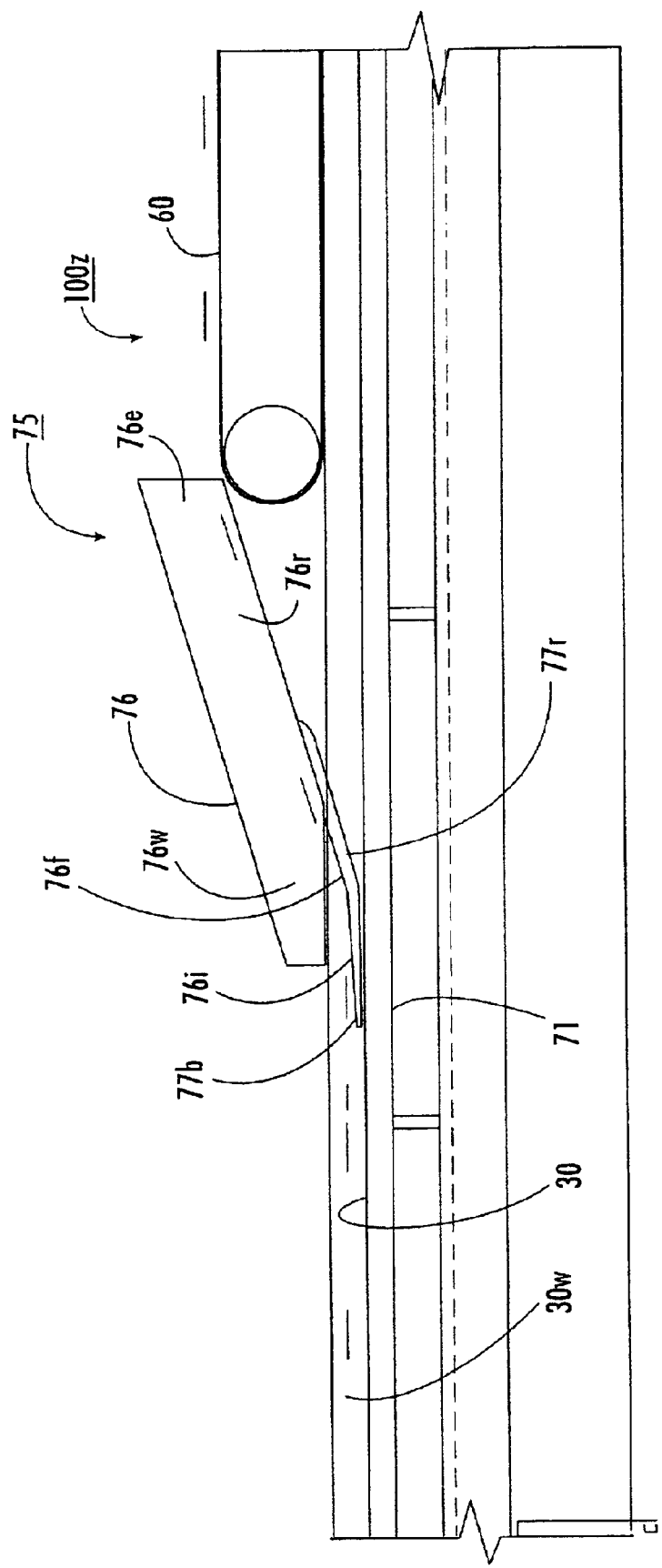

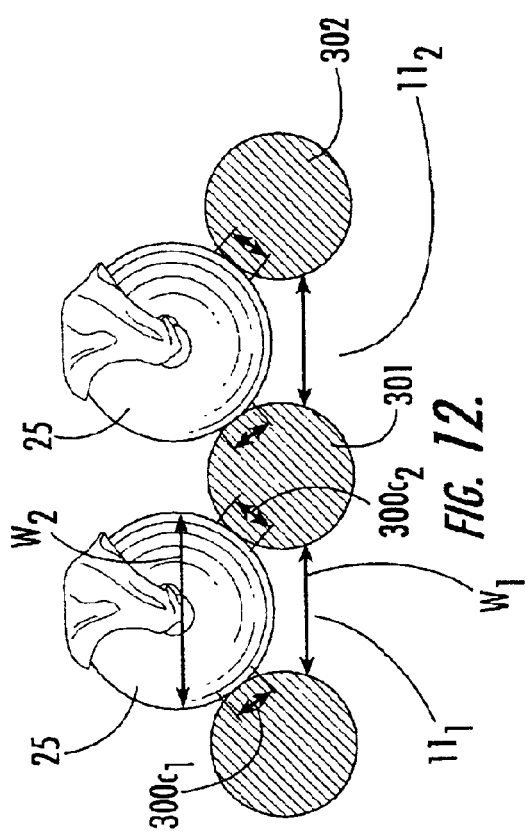
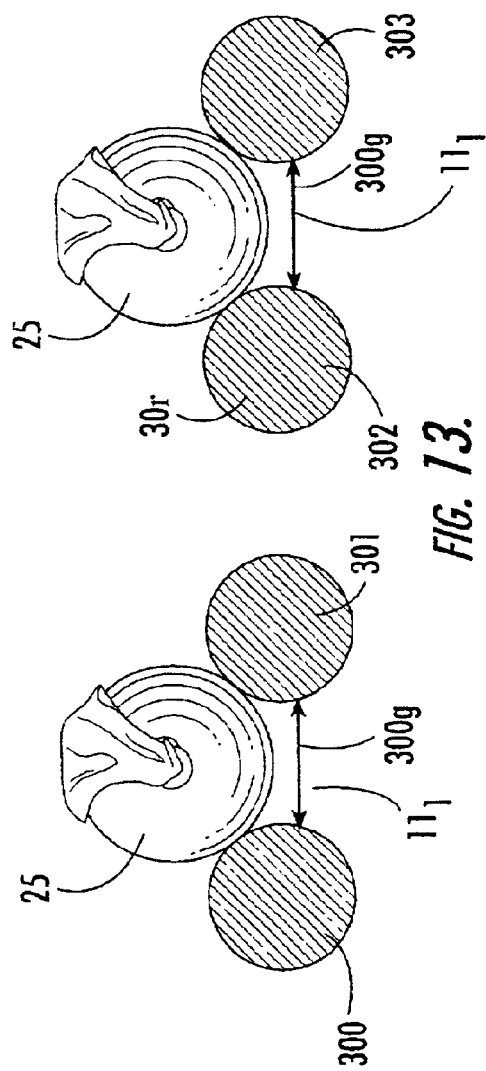

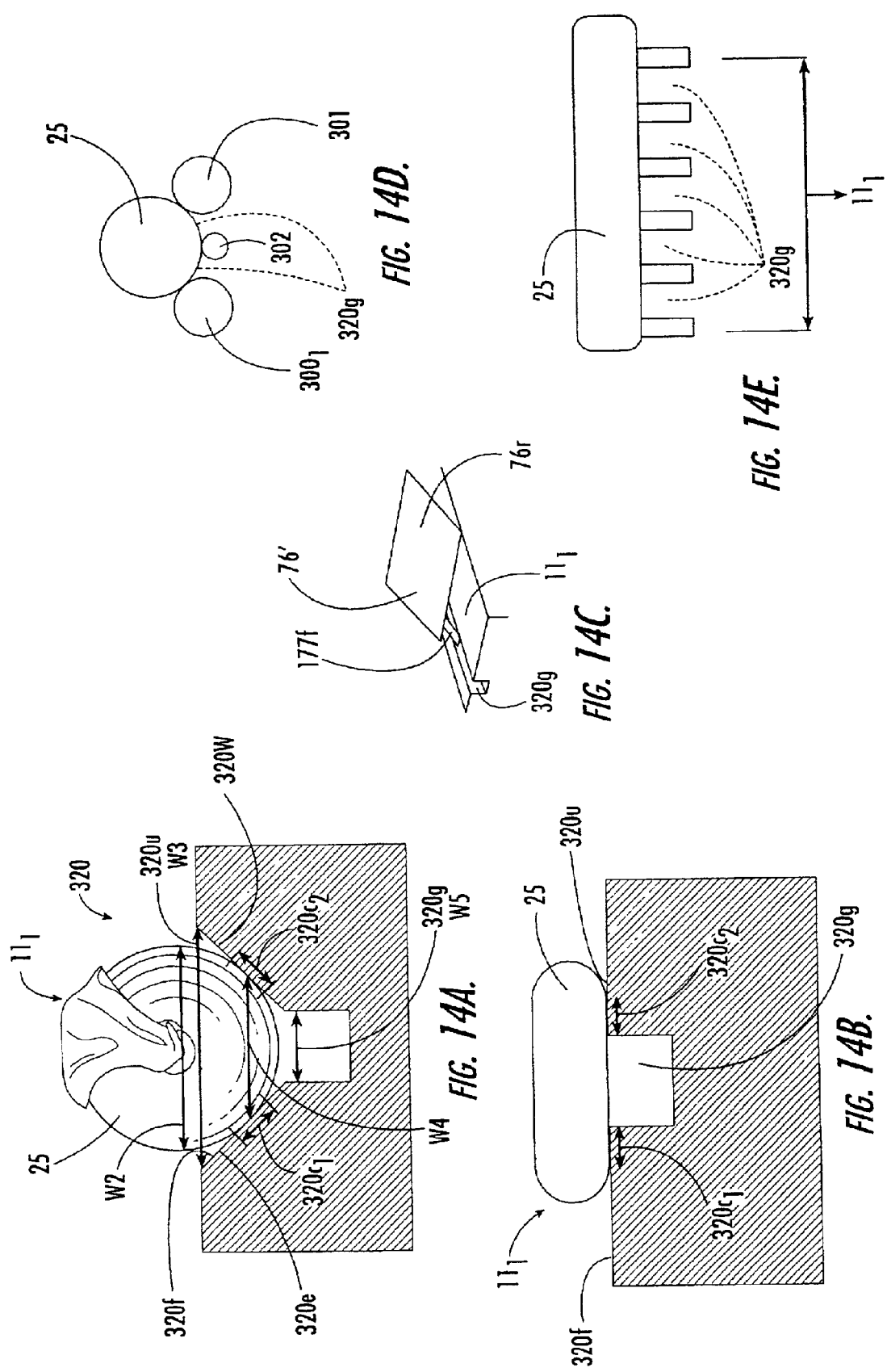

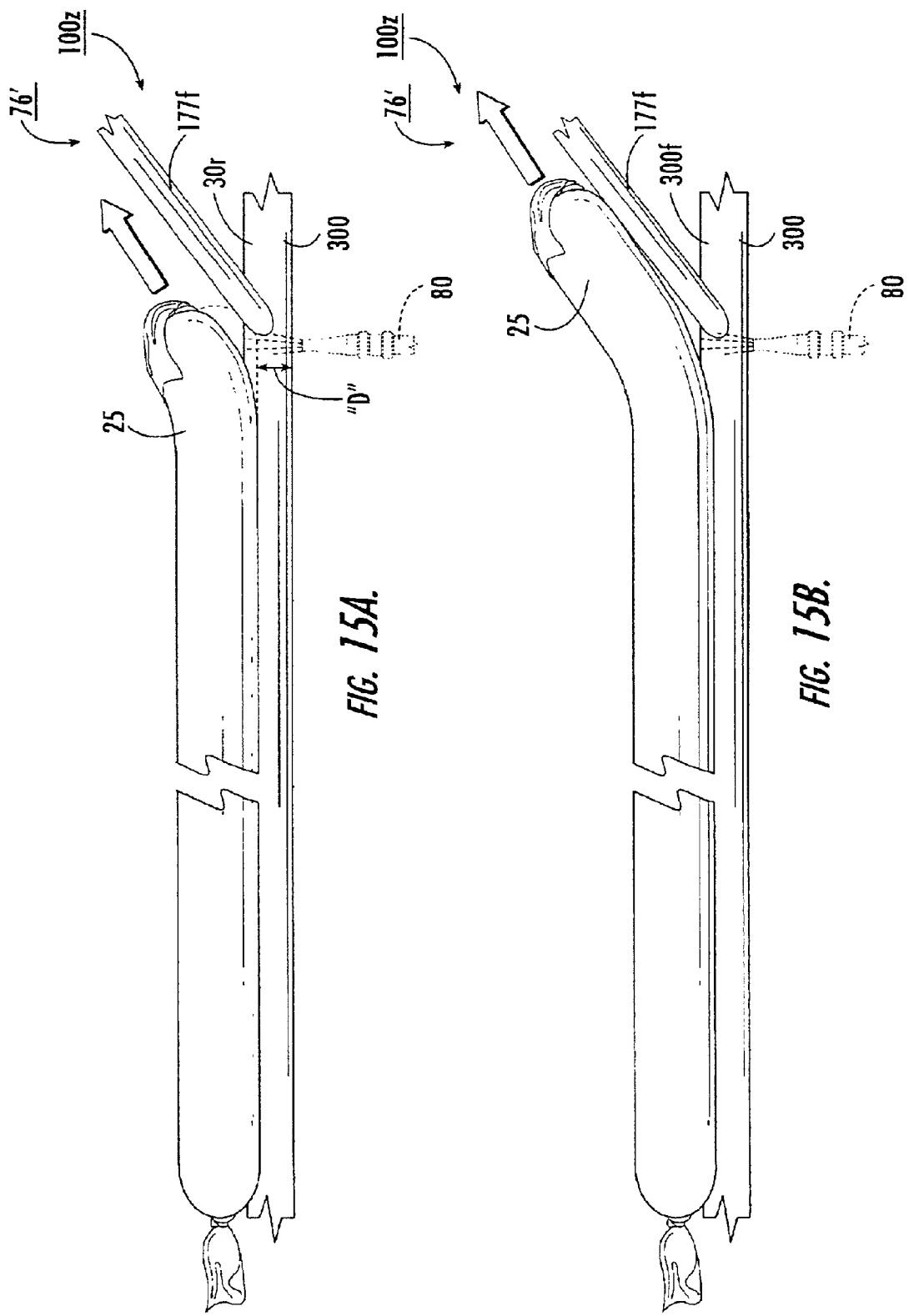

FOOD TRANSPORT ROUTING SYSTEMS, DEVICES, AND GUIDES FOR FOOD PROCESSING SYSTEMS AND RELATED METHODS

RELATED APPLICATION

This application claims priority from U.S. Provisional Patent Application Serial No. 60/354,097, filed Feb. 4, 2002, the contents of which are hereby incorporated by reference as if recited in full herein.

FIELD OF THE INVENTION

The present invention relates to food treatment systems such as vertical rise dryers, smokers, curing chambers, ovens, warmers, coolers, and freezers.

BACKGROUND OF THE INVENTION

Conventionally, several different food treatment system configurations have been proposed to smoke, cure, dry, cook, cool, or freeze food products (such as meat products) with the hope of increasing production capacity while attempting to limit the floor space required for carrying out same. In so doing, vertical rise systems have been used with spiral conveyors to move food vertically through the oven while exposing the food to certain processing conditions as it moves from top to bottom or bottom to top.

For example, the Northfield LST (Large Spiral Technology) freezer available from Frigoscandia Equipment (fmcfoddtech.com) is a high capacity non-self stacking spiral freezer that employs spiral conveyors with belts available in different widths. Ryson International Inc. of Newport News, Va., provides spiral conveyors that allegedly feature a small footprint and space savings over other brands with load capacities of up to 200 fpm.

Another example is the TURBO-Dryer® from Wyssmont (wyssmont.com). The TURBO-Dryer® uses a stack of slowly rotating circular trays. In operation, food is fed onto the top tray and, after one revolution, is wiped or swept onto the next lower tray where the operation is repeated. The trays are enclosed in a vertical enclosure that circulates heated air or gas about the food on the trays. All or selected levels in the enclosure may be held at a uniform temperature or the enclosure may be configured with zoned temperature regions having different temperatures.

Yet another example of vertical rise system is found in U.S. Pat. No. 5,942,265 which describes conveying pepperoni meat to a conventional spiral dryer which includes a number of tiers (typically about 38–42) according to the initial moisture level, the desired final moisture level, the relative humidity of the air, the total amount of water to be removed, the temperature, and the conveyor speed.

Recently, U.S. patent application Ser. No. 09/888,925 to Shefet et al. described an increased capacity food processing system that can limit the amount of dedicated floor space required to support the system in food processing facilities and/or that can increase the amount of food that can be processed through the food processing system over a production period. The contents of this application are hereby incorporated by reference as if recited in full herein.

Despite the above, there remains a need to provide food routing apparatus in food processing systems, particularly in high-speed mass production systems, that can effectuate food transfer along desired travel paths in an automated manner that promotes continuous movement and/or inhibits machine or system downtime.

SUMMARY OF THE INVENTION

The present invention provides food transport or routing methods, systems, and apparatus that are suitable for commercial mass-production (high-capacity) substantially automated food processing systems.

In certain embodiments, the commercial and/or mass production transport systems, mechanisms, and guides for food processing are configured so as to automate food transport to direct food products to travel serially over side-by-side travel paths using a pick-up device and/or router guide with guide channels while also allowing food to be diverted to desired alternate paths. In certain embodiments, the systems are able to laterally translate the food products that may travel in the side-by-side travel paths so as to automatically move the food from a first travel path to a different second travel path while the food is being propelled forward so that the food travels greater than one, and typically a plurality, of revolutions about a tier or level in a food processing unit. In other embodiments, a food diverter can be configured to operate (with moving or stationary floors) to dislodge, pick-up, push, or pull the food item from a support substrate to a different support surface or member. That is, the food items can be stationary on a support floor (that can itself be stationary or movable) and the food diverter can be configured to move into the flooring under the support surface to dislodge, scoop, push, or pull the food item from the support surface onto the diverter.

The router guide can define a stationary or movable (linear) travel region with a stationary or moving floor that cooperates with stationary or moving floors (such as one or more conveyors) located on one or either side of the router guide. In certain embodiments, the router guide is stationary and resides in the line of travel of the food and is positioned between two moving floors to transfer food being advanced therebetween so as to provide the desired speed and inhibit collisions or disruptions in the transport process. In other embodiments, the router guide is dynamically configured to repetitively extend and retract into the travel path (either in-line with the travel lanes/paths of the food or positionally offset relative thereto).

The travel path can include a transfer zone and the transfer zone can be formed of one or more moving floors, stationary floors, or combinations of each. The router guide may also be stationary in the transfer zone or be dynamically locatable in its desired transfer position. Accordingly, the floors of the transfer region may be stationary, may move, and may cooperate with a dynamic or stationary router guide as desired for a particular application or food transfer need.

In certain embodiments, the moving floor proximate the router guide is configured with a support surface that has a gap portion that underlies a food product. The router guide can include a downwardly extending finger that, in operation, is received into the gap of the moving floor underlying the food to thereby direct, scoop, or lift the food onto or over the finger and through the router guide so as to automatically cause or direct the food to travel a desired travel path associated therewith. A portion of the adjacent downstream travel path (downstream of the finger) can be defined by the inclined or ramped portion of the router guide. As such, as described above, the finger and ramped router guide can direct the food upward or downward to a subsequent lateral path transition zone so as to advance the food in the processing system environment.

In other embodiments, the router guide finger can be configured to retract and extend to repetitively enter the gap portion(s) of the floor so as to engage with a stationary or moving floor, and, in operation, dislodge food items resting on the surface of the floor proximate the underlying finger of the router guide.

In certain embodiments, the food item travels over a plurality of tiers in a vertically stacked tier arrangement and the food item travels a plurality of revolutions about each tier before moving to the next tier. Such an arrangement can increase the amount of product that can be concurrently processed and/or reduce the unused volume in vertical rise systems over conventional designs.

The food processing system can be configured to provide separate temperature regulated (and moisture or humidity, air velocity, cooling, heating, sprinkling, gas, and the like) spaces over one or more tiers in the vertically stacked ovens (or over other spaces in non-stacked ovens).

Certain embodiments are directed to methods for routing food in a food processing system having a plurality of side-by-side predetermined travel lanes. The method includes: (a) advancing a food item over a first travel lane in the food processing system; then (b) directing the food item through a lateral router guide having a floor and opposing ingress and egress portions; and then (c) releasing the food item from the egress portion so that the food item continues forward to a second travel lane that is laterally spaced apart a distance from the first travel lane.

In particular embodiments, the advancing step may include conveying using at least one conveyor with an associated conveyor speed that engages with the router guide. The router guide itself may have a moveable or stationary floor (or combinations thereof). The directing step can include the steps of receiving the elongated food item into the ingress portion of the router guide; and advancing the elongated food item through the stationary router guide at least partially responsive to the forward momentum generated by the conveying speed.

Other embodiments are directed to methods of moving food items to be cooked or cured through a food processor having an oven. The methods include: (a) concurrently transporting a plurality of strands of elongated food such that the elongated food strands can travel over separate ones of side-by-side selectable pre-determined travel lanes at a first speed; (b) directing the elongated food strands to travel separately through different respective side-by-side stationary pick-up guides, each pick-up guide having a floor, a ramped portion and opposing ingress and egress portions, so that each elongated food strand enters a respective pick-up guide and is directed to follow the ramp and exit from the egress portion thereof, and (c guiding the elongated food strands separately onto a lateral router guide after the directing step so that the each of the elongated food strands are concurrently translated a lateral distance proximate to but downstream of the pick-up guides to cause the strands to concurrently laterally alter their travel lanes in a predetermined manner.

In particular embodiments, a diverter conveyor (positioned downstream of the router guide) defines a moving floor that cooperates with a plurality of separate side by side guide channels having an associated width and upwardly extending walls to guide the lateral translation of the elongated food strands to move along the desired transition travel path. The elongated food strand can be a meat product held in a collagen casing that may present increased friction during processing (tactile adhesiveness or stickiness).

Other embodiments are directed to methods of transporting food through a vertically stacked multi-tier food processor having a plurality of predefined side-by-side travel lanes. The method includes transporting at least one food item over a predetermined travel path in a food processor having a plurality of vertically stacked tiers which are longitudinally spaced apart, wherein a plurality of the tiers have a plurality of side-by-side travel lanes such that the food item travels greater than one revolution in a tier to pass by a reference location a plurality of times before moving to the next predetermined tier. The transporting step comprises transporting the food item on at least one tier such that the food item moves, in serial order, over a first moving floor portion, to a cooperating stationary floor portion, and to a cooperating second moving floor portion before the at least one food item moves to the next predetermined tier.

In certain embodiments, the stationary floor portion is defined by a forward member of a pick-up guide having a ingress planar lower edge portion that terminates into an inclined ramp portion with upwardly extending sidewalls and an egress upper edge portion. The directing step can also include directing the food to travel over a diverter conveyor moving floor portion after the stationary floor portion and before the second moving floor. The diverter moving floor portion may be located at a height that is below the egress upper edge portion. In other embodiments, the forward member of the pick-up guide angularly extends downwardly to a location below the surface of the food upstream of and proximate to the pick-up guide.

As before, in operation in certain particular embodiments, the food item can be propelled forward to travel upwardly on the inclined ramp over or through the router guide (that may have a dynamic or stationary floor portion) that is positioned intermediate the first moving floor portion and the diverter moving floor portion.

Other embodiments are directed to commercial capacity food processing apparatus. The apparatus includes: (a) a housing defining an enclosure and having a food inlet and a food outlet and a predetermined food travel path therethrough; and (b) a plurality of stacked tiers residing in the housing. The tiers include: (a) at least one moving floor configured to move a food product in a predetermined tier travel path, the tier being configured with a plurality of side-by-side travel lanes; (b) a plurality of pick-up guides, a respective one for each of the travel lanes, positioned downstream of and in the predetermined travel path, in cooperative communication with the at least one conveyor, the pick-up guides having upwardly extending opposing sidewall portions and opposing food ingress and egress portions with a ramped portion extending therebetween; and (c) a plurality of router guide channels located downstream of the pick-up guides and in cooperating communication therewith, each guide channel having upwardly extending side walls that overlie a guide channel floor adapted to support the food as the food travels through a respective guide channel, wherein, in operation, the router guide channels guide the food product from a first travel lane into a different predetermined laterally altered travel lane, wherein the guide channels upwardly extending sidewalls define an angular departure from the primary travel direction between the pick-up guides and the portion of the predetermined travel path that is located downstream of the router guide channels, so that, in operation, the at least one food product is directed to travel through a respective guide channel and laterally alter its travel path from a first travel lane to a second predetermined travel lane.

In certain embodiments, the guide channel sidewalls are arranged in parallel alignment. The router guide floor and/ the pick-up guide floor may be stationary or may be configured to move.

Still other embodiments are directed to mechanisms for directing the movement of a food product. The mechanism includes a pick-up guide having opposing ingress and egress end portions and a ramp portion extending therebetween, the pick-up guide having a floor and upwardly extending sidewalls on opposing sides thereof, wherein the ingress portion includes an angularly extending protruding forward member. In position, and in operation, the pick-up guide is adapted to accept food being propelled forward at a desired speed and direct the food to change its vertical height as it travels over the length of the router guide.

Still other mechanisms are configured to alter the lateral direction of travel of a food product. The device includes a food travel floor having a lateral transition zone with a floor for supporting the food as it moves through the transition zone, the floor having a predetermined length that is a minor portion of the length of the food travel path. The device also includes a plurality of guide channels configured to overlie and cooperate with the floor, the guide channels having upwardly extending sidewalls and opposing forward and rearward portions that are configured to define parallel laterally translating travel spaces therein. The guide channels receive food items therein and move the food items forward in a laterally translated direction relative to the direction at entry thereto as the food item moves from the forward portion to the rearward portion thereof.

The foregoing and other objects and aspects of the present invention are explained in detail in the specification set forth below.

BRIEF DESCRIPTION OF THE DRAWINGS

FIG. 3A is a side view of a portion of a travel path illustrating a pickup/transfer zone with associated guides and routers for a food product according to embodiments of the present invention.

FIG. 3B is a side view of a portion of a travel path and associated guides and routers according to alternate embodiments of the present invention.

FIG. 12 is a front section view of a portion of a floor according to embodiments of the present invention.

FIG. 13 is a front section view of a portion of a floor according to embodiments of the present invention.

FIG. 14A is a front section view of a portion of a floor according to other embodiments of the present invention.

FIG. 14B is a front section view of a portion of a floor according to other embodiments of the present invention.

FIG. 14C is a front section view of a portion of a floor according to other embodiments of the present invention.

FIG. 14D is a front section view of a portion of a floor according to other embodiments of the present invention.

FIG. 15A is a side partial view of a portion of a food travel path with the food being guided forward as it approaches a finger positioned lower than the upper surface of the floor in a food guide transition zone.

FIG. 15B illustrates the food shown in FIG. 15A with the food progressing forward up the finger of a router guide according to embodiments of the present invention.

DESCRIPTION OF EMBODIMENTS OF THE INVENTION

Figure 1:
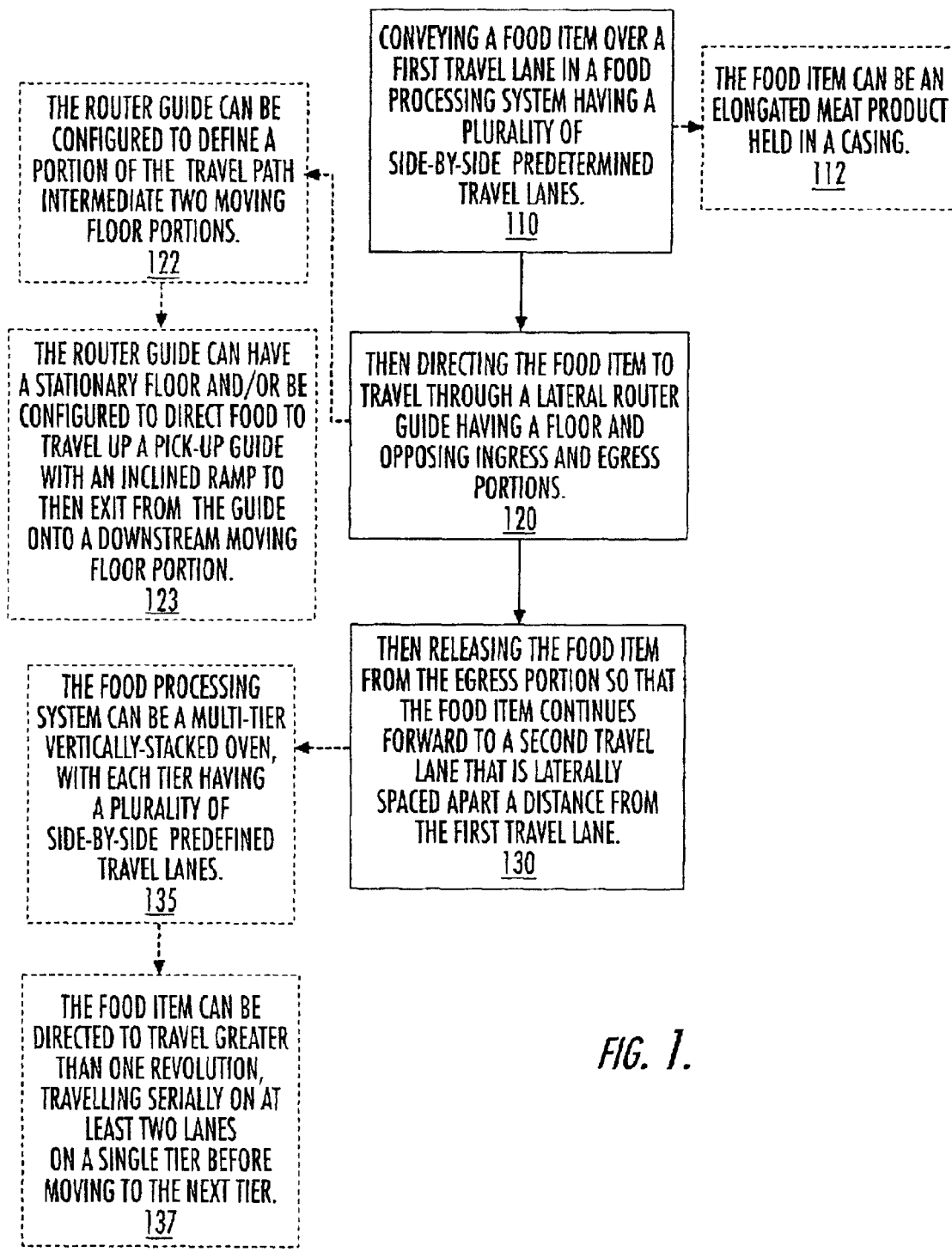
FIG. 1 is a block diagram of operations for routing food through a portion of a food processor according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations.

In the description of the present invention that follows, certain terms are employed to refer to the positional relationship of certain structures relative to other structures. As used herein, the term "forward" and derivatives thereof refer to the general or primary direction that food travels as it moves inside a food processor from a processing point or region to the next processing point or region; this term is intended to be synonymous with the term "downstream," which is often used in manufacturing environments to indicate that certain material being acted upon is farther along in the manufacturing process than other material. Conversely, the terms "rearward" and "upstream" and derivatives thereof refer to the directions opposite, respectively, the forward and downstream directions.

The present invention is directed to food processor systems. The systems can be used in commercial low volume and/or large-scale mass production of food items. The food processor system can be a vertical rise system and can include different zones exposed to different processing conditions, such as one or more of a dryer, a heater, an oven, a curing or smoking source, a cooler or refrigerator or freezer and the like. The food processor can be configured to process solid or semi-solid food items or liquid items in containers or casings or shells. Examples of food items include, but are not limited to, baked goods, candies, bakery and dairy products, and meat products. In certain embodiments, the food processing system and/or related devices may be particularly suitable to process discrete low profile items (substantially planar or flat objects), as well as elongated food items such as, but not limited to, elastic or partially elastic food items such as cheese (like mozzarella strands), dough (for incubation), meat sticks or strands, and the like.

Of course, the processing system can be configured to convey or move other items through a processing facility where enhanced capacity is desired. For example, the processing system may be adapted for medical products, pharmaceuticals where sterilization is desired or for implements, surgical tools or other items desiring sterilization, or manufacturing facilities for products undergoing curing, coating, brazing, tempering, sintering, or other processing condition. Still additional examples of other elongated products that may be routed, guided, or handled by the devices, methods, and systems of the instant invention include candles, ropes, cables, wires, and the like. See U.S. Pat. No. 4,582,047 and RE35,259, U.S. Pat. No. 5,942,265, U.S. Pat. No. 5,078,120, and U.S. Pat. No. 4,079,666 for discussions of exemplary processing conditions for food and conveyor means, the contents of which are hereby incorporated by reference as if recited in full herein.

In certain embodiments, the present invention is used to move a length of an elongated product held in a casing. The casing can be any suitable casing (edible or inedible) such as a collagen casing. The elongated product can be an elongated meat product. Exemplary products include, but are not limited to, strands of meat such as pepperoni or beef, a processed meat product such as a pepperoni or beef stick, sausage, hotdog, or the like.

The elongated meat product can be configured as a contiguous or continuous length of product. The length may be selected so as to cover one or a plurality of lanes, tracks or perimeter paths over at least one tier or level. In certain embodiments, the length of product is contiguous or continuous so as to be able to extend over at least one revolution in a lane in a desired travel path. In certain embodiments, the elongated meat product has a length of at least about 20–25 feet, and preferably at least about 50 feet. In particular embodiments, the elongated meat product can have a length of between about 50–85 feet or more.

The elongated food item may be elastic (at least in tension) so as to allow stretching without unduly altering or deforming its desired shape during processing. The elongated food item may be held in a natural or synthetic casing. In operation, the elongated meat product may have an exterior surface that exhibits increased friction relative to a finished, cured, or dried configuration. For example, a collagen casing can be described as having a relatively gelatinous sticky residue prior to its finished state that can cause the food to attempt to stick to a floor or support surface during transport and may make it difficult to route or guide this type of product in an automated relatively fast speed transport arrangement, particularly where non-linear or selectably changeable travel paths are desired.

Turning now to FIG. 1, operations suitable for carrying out embodiments of the present invention are shown. A food item is conveyed over a first travel path in the food processing system (block 110). As noted above, the food item can be an elongated meat product held in a casing (block 112). The food item is then directed to travel through a router guide assembly having a floor and opposing ingress and egress portions (block 120). The food item can then be released from the egress portion of the router guide assembly so that the food item continues forward to a second travel path that is laterally spaced apart a distance from the first travel path (block 130). "Laterally spaced apart" means that the food is moved sideways and/or in a direction that is substantially perpendicular to the upstream/downstream or primary direction of travel or orientation of the travel lane(s) either in an inward or outward direction (moving either to the right or left away from the primary direction of travel).

The router guide assembly can include a stationary picker device that has a corresponding floor. The picker device first engages with the food and "picks up" or directs the food up into the router guide lane changeover region (also having an associated floor with lanes that are linearly offset or angled from the lanes located upstream and downstream therefrom). As such, the router guide assembly defines a minor portion of the travel path between two moving floor portions (block 122). The router guide assembly can be configured to accept the food item from the first moving floor portion and direct the food item to travel up an inclined ramp to then exit from the guide assembly onto the downstream second moving floor portion (block 123). The food processing system can be a multi-tier oven with a food travel path that includes a plurality of side-by-side defined travel lanes in each tier (135). On each or selected tiers, the food item can be directed to travel greater than one revolution, traveling on at least two adjacent lanes on a single tier before moving to the next tier (block 137).

Figure 2:
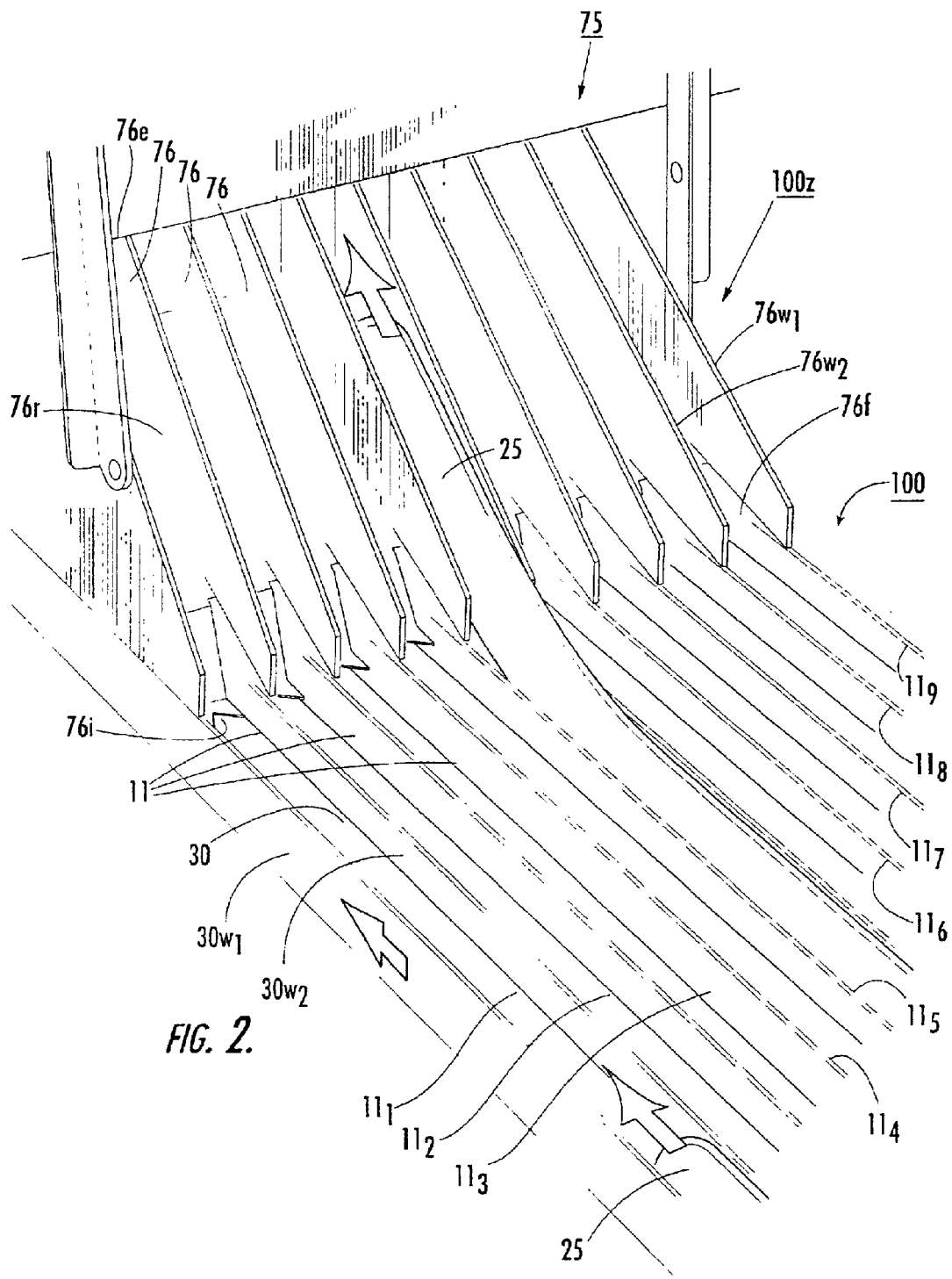
FIG. 2 is a front perspective view of a portion of a travel path illustrating a pick-up/transfer zone for a food product according to embodiments of the present invention.

Turning to FIG. 2, one embodiment of a portion of a travel path 100 in a food processing system 10 (FIGS. 6 and 8) with a food product 25 and a transfer or changeover zone or region 100z (shown as a lateral translation region or zone) is shown. The arrows shown in FIG. 2 with respect to each of the food products 25 (one in lane $11_1$ and the other in lane $11_5$) indicate the direction of travel or food movement along a particular tier. The direction of travel can be reversed where desired and/or alternated between tiers in multi-tier systems.

The travel path 100 includes a plurality of side-by-side adjacent travel lanes 11. In the embodiment shown, there are nine side-by-side lanes 11: namely, from the left side to the right side, a first lane $11_1$, a second adjacent lane $11_2$, a third adjacent lane $11_3$, a fourth adjacent lane $11_4$, a fifth adjacent lane $11_5$, a sixth adjacent lane $11_7$, an eight adjacent lane $11_8$, and a ninth adjacent lane $11_9$. In operation, in particular embodiments, the food product 25 can serially progressively travel over each or selected lanes. The food travels more than one revolution, and in so doing, passes a predetermined reference location associated with the tier a plurality of times. In certain embodiments, the food initiates travel from a predetermined lane (that may be the outer or inner lane) and moves across the a number "n" of intermediately positioned lanes to an opposing lane. In the embodiment shown, the product 25 can start from either the inner lane $11_1$ or outer lane $11_9$. For multi-tier configurations with circular, oval, elliptical or other endless lane configuration, the system may be configured so that the food alters travel direction and/or lane progression so as to travel from a selected inner lane portion to a selected outer lane portion then to a selected outer lane portion to a selected inner lane portion on adjacent or selected tiers, or vice versa (see, e.g., FIG. 9). For additional description of multi-tier systems and/or the alternating lane travel progression, see U.S. patent application Ser. No. 09/888,925 to Shefet et al., incorporated by reference hereinabove.

In certain embodiments, a plurality of non-connected elongated products are processed concurrently and the products are forced to laterally translate a sufficient distance to cause the products to skip adjacent lanes and to subsequently travel over a respective lane that is laterally spaced over a predetermined number of lanes from its first travel lane. For example, if three separate products 25 are processed, the first may travel in lane $11_1$, the second in lane $11_2$, and the third in lane $11_3$. As they approach the transfer zone 100z, the first product in lane $11_1$ is laterally transferred over to lane $11_4$ (and then to $11_7$ if it travels another revolution over the tier), the second product to $11_5$ (and then to $11_8$ if it travels another revolution over the tier), and the third product travels or is diverted to lane $11_6$ (and then to $11_9$ if it travels another revolution over the tier).

Referring again to FIG. 2, a router guide assembly 75 is shown. The router guide assembly 75 includes a plurality of pick-up guides 76, one for each of the travel lanes 11 (as shown, one for each of lanes $11_1$–$11_9$). The pick-up guide 76 is configured to define a minor portion of the travel path. The pick-up guide 76 includes an ingress portion 76i and an egress portion 76e. The pick-up guide 76, as shown, may, in certain embodiments, be configured with a ramp portion 76r between the ingress and egress portions 76i, 76e (see also FIG. 3). The pick-up guide 76 includes a floor portion 76f and two opposing upwardly-extending sidewalls 76w1, 76w2 that help retain the food in its respective lane as it travels through the pick-up guide 76. Upstream of the router guide assembly 75, the travel lanes include a floor 30 that may be configured as a moving floor 30. The floor 30 can be defined by rollers, belts, or one or more conveyors (serially aligned and/or side by side) or may include a stationary floor 30. In certain embodiments, as shown in FIG. 2, the floor 30 may be operably associated with guidewalls 30w1, 30w2 (or referred to generally as "30w" in subsequent figures) that help separate the travel lanes 11.

Referring now to FIG. 3A, it is shown that the floor 30 and the ingress portion 76i of the pick-up guide 76 are configured to cooperate so that the pick-up guide 76 is aligned with a corresponding travel lane 11 so as to receive the food 25 from a respective upstream lane and then direct that food item to travel into the chute defined by the ramp portion 76r. The ingress portion 76i of the pick-up guide can be configured to be substantially flush with (or under) the upper surface of the floor 30.

FIG. 3A illustrates that, in certain embodiments, a single length of conveyor defines upstream and downstream portions of the travel path (upstream and downstream of the lane transfer region). In other embodiments, separate discrete longitudinally spaced apart (such as in front of and behind the lane transfer regions) conveyors can be employed (not shown). Where the upstream portion of the lane has a moving floor 30 that is defined by a conveyor that terminates proximate the pick-up guide 76, the ingress portion 76i of the router guide 76 may be disposed under or at the same level as the upper primary surface of the floor (not shown).

As shown in FIG. 3A, the ramp portion 76r may be configured to incline a distance above the moving floor 30 so that the food is released at a distance above the height that it was at the ingress portion 76i of the pick-up guide 76. In other embodiments, the pick-up guide 76 may be configured with a decline (not shown) to release food at a level lower than that at which it was received. Air or other desired fluid or gas may be dispersed upward relative to the floor surface (s) and used to inhibit the food from attaching or sticking to the exposed transport surfaces in the pick-up guide 76 and/or to suspend the food above the surface of the pick-up guide floor 76f. As shown, air may (optionally) be introduced at various locations along the transfer zone 100z as desired. For example, air may be directed to expel proximate the ingress portion of the pick-up guide 76i and/or vertically dispersed upward along the floor of the ramp 76r (similar to an air hockey table arrangement). As shown in FIG. 3A, air (such as in the form of an air knife) may also be forceably directed downward at the egress portion 76e of the pick-up guide 76 to help direct the food to travel down onto the next (downstream) portion of the travel path. Other selected locations, one or more combinations of air in different locations, or no air may be used, depending on the application.

It is noted that although the floor of the downstream portion of the travel path shown in FIG. 3A is substantially flush or at substantially the same height as the egress portion 76e of the pick-up guide 76, the present invention is not limited thereto. For example, in certain embodiments, the floor 60 of the downstream travel path proximate the egress portion of the pick-up guide 76e is lower so that the food 25 (FIG. 2) drops onto the floor surface 60 (with the aid of gravity and/or the air noted above).

In certain embodiments, the pick-up guide floor 76f is stationary and the food item is propelled through the pick-up guide 76 via its forward momentum with sufficient speed and/or force to inhibit deformation of the food item as it travels through the pick-up guide 76 and/or lateral food transfer region in the tier. In other embodiments, the floor or a portion thereof 76f may be configured with moving components such as conveyors, rollers, bearings, or other discrete translatable, rotatable, or sliding components, as is well known to those of skill in the art.

Figure 4A:
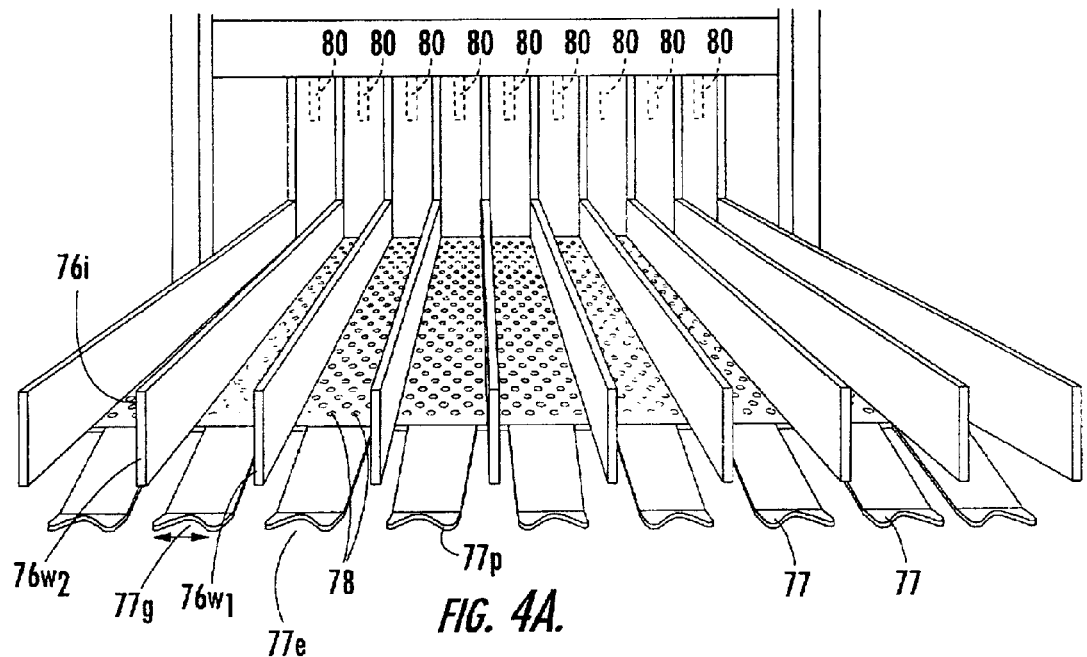
FIG. 4A is front view of a mechanism that includes a plurality of side-by-side router and/or pick-up guides according to embodiments of the present invention.
Figure 4B:
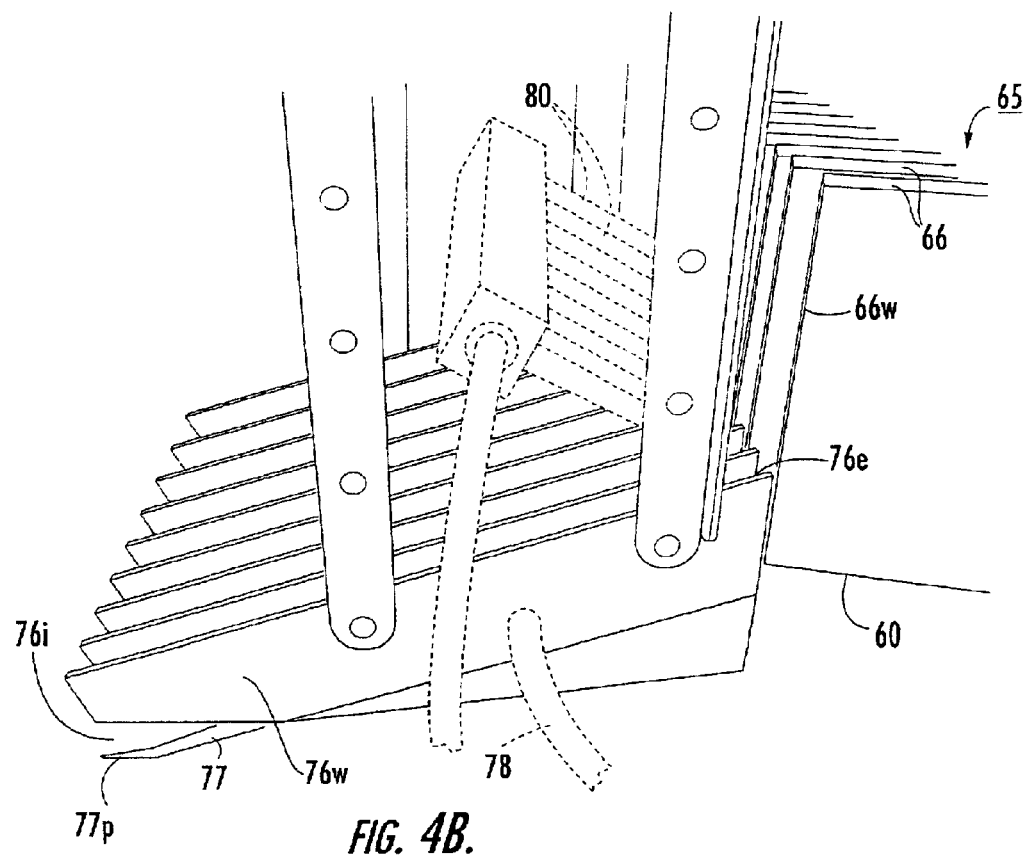
FIG. 4B is a side view of the device shown in FIG. 4A.

FIGS. 4A and 4B illustrate the pick-up guide 76. In the embodiment shown, the pick-up guide 76 is disposed in the travel lane as the food approaches the lateral adjustment or lane transition region or zone 100z on the travel path in the tier of a food processing unit or system. In other embodiments, the pick-up guide 76 may be configured so as to be offset from the travel direction of the food (not shown). As shown in FIGS. 4A and 4B, the front edge or ingress portion of the pick-up guide 76i can include a forward member 77 or scoop that includes a substantially planar portion 77p. As shown, the forward member 77 can include an edge portion 77e that is forked. In operation, as the food is moved or moves forward on the floor 30 (FIGS. 2, 3), the forward member 77 can be configured to cooperate with the floor 30 so that, in operation, the food travels off the moving floor 30 onto the upward surface of the forward member 77. The forward member 77 and the floor of the pick-up guide 76f may be formed from stainless steel or other suitable material, as is known to those of skill in the art. The forward member 77 may reside on the surface of the floor 30. In certain embodiments, the forward member 77 acts as a stationary finger that can scoop or pick-up the food 25 as it advances in the travel path along the floor 30 to contact the forward member 77.

In certain embodiments, the food is held so that it is substantially centered over the gap 77g defined by the fork (the gap narrowing toward the ramp portion 76r of the router guide) even when the food is moving at a rate of between about 1–20 feet per second, typically about 1–10 ft/sec, and more typically about 5 ft/sec, just before it enters the pick-up guide 76. Other speeds may be used depending on the application (dwell time, food configuration or size, food density, food frictional parameters, and the like). In other embodiments, the food and its support floor 30 are stationary, and the pick-up guide 76 can be configured to translate to engage with the food to dislodge, pick-up, pull, or push the food from the floor 30 (not shown). Thus, referring again to FIGS. 3A, 3B and 4A, the food is propelled forward until it exits the router guide egress 76e and lands on the adjacently positioned downstream floor 60 that is defined by the conveying surface of a diverter conveyor 60c.

FIG. 3B illustrates that, in certain embodiments, the forward member 77 extends a distance below the sidewalls 76w of the pick-up guide 76. The forward member 77 can include an angled or beveled edge portion 77b to help engage or scoop the food (gradually increasing in thickness along the travel direction) while minimally disrupting the forward movement thereof as the food approaches the transition zone 100z. The forward member 77 can be angled at an angle corresponding to the angle of the ramp 77r of the pick-up guide 76. In this way, the cooperate so that the pick-up guide 76 is aligned with a corresponding travel lane so as to receive the food from the upstream lane and then direct that food item to travel into the chute defined by the ramp portion 76r. As is also shown in FIG. 3B, the pick-up guide 76 can be used alone, without the downstream lane changeover router guide device 65 or the associated upwardly extending guidewalls 76w, 66w (FIG. 3A) (that provide the lateral lane transition). The floor of the forward member 77f can be stationary (formed of a plate or other static structure) or may include rollers, bearings, or other suitable support components.

As shown in FIGS. 4A and 4B, each pick-up guide 76 can be configured to share sidewalls 76w with its neighbor such that the inner sidewall of one pick-up guide 76 is the outer sidewall for adjacent pick-up guides 76. The sidewalls 76w themselves may be configured to start at a height that is above the height of the floor (or at or above the height of the sidewalls 30w, FIG. 3b) at the ingress portion 76i, then, the walls 76w may angularly converge down to attach to the floor 76f of the pick-up guide 76r in the ramp portion 76r.

FIG. 4B also illustrates that the router guide assembly 75 can be operaby associated with a lateral changeover or lateral router guide 65. The lateral router guide 65 includes a plurality of side-by-side guide lanes or channels 66, one each configured to communicate with a respective one pick-up guide 76. The lateral router guide 65 includes a floor 60 that may be stationary or moving. In certain embodiments, the floor 60 is defined by a diverter conveyor 60c. The floor 60 or diverter conveyor 60c can be configured so as to define a minor or relatively short portion of the travel path on a particular tier and can guide or direct the lateral transition of the food from one travel lane to its next desired lane. As shown in FIG. 4B, the guide channels 66 each include a pair of upwardly extending opposing sidewalls 66w that overlie the floor 60. The floor 60 can be set to move at a rate that is above, below, or the same as that of the upstream floor 30 and/or 76f (FIG. 3b). The floor 60 can be formed of stainless steel or other suitable material (with or without any surface treatments to inhibit adhesion of the food and/or microbial growth, as can the other portions of the travel path defining the lane or support surface). The diverter conveyor 60c may be an endless loop conveyor as shown.

Figure 5:
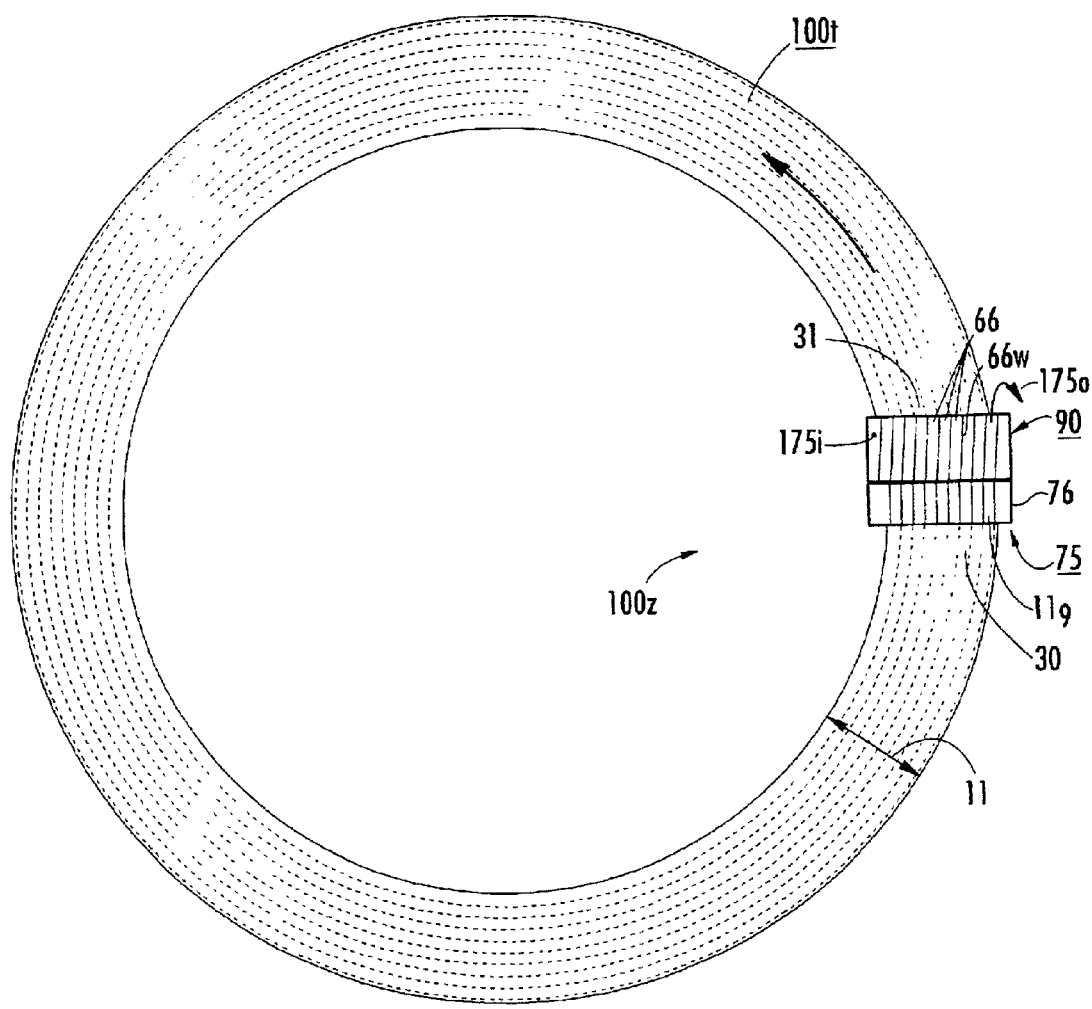
FIG. 5 is a top schematic view of a tier of a food processor system according to embodiments of the present invention.
Figure 7:
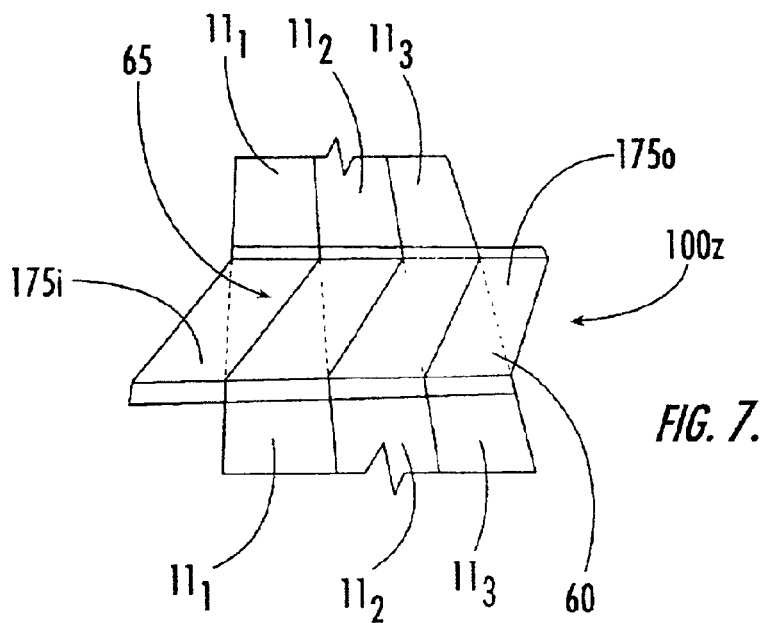
FIG. 7 is a top view of a lateral translation zone and exemplary devices in a processing system according to embodiments of the present invention.
Figure 9:
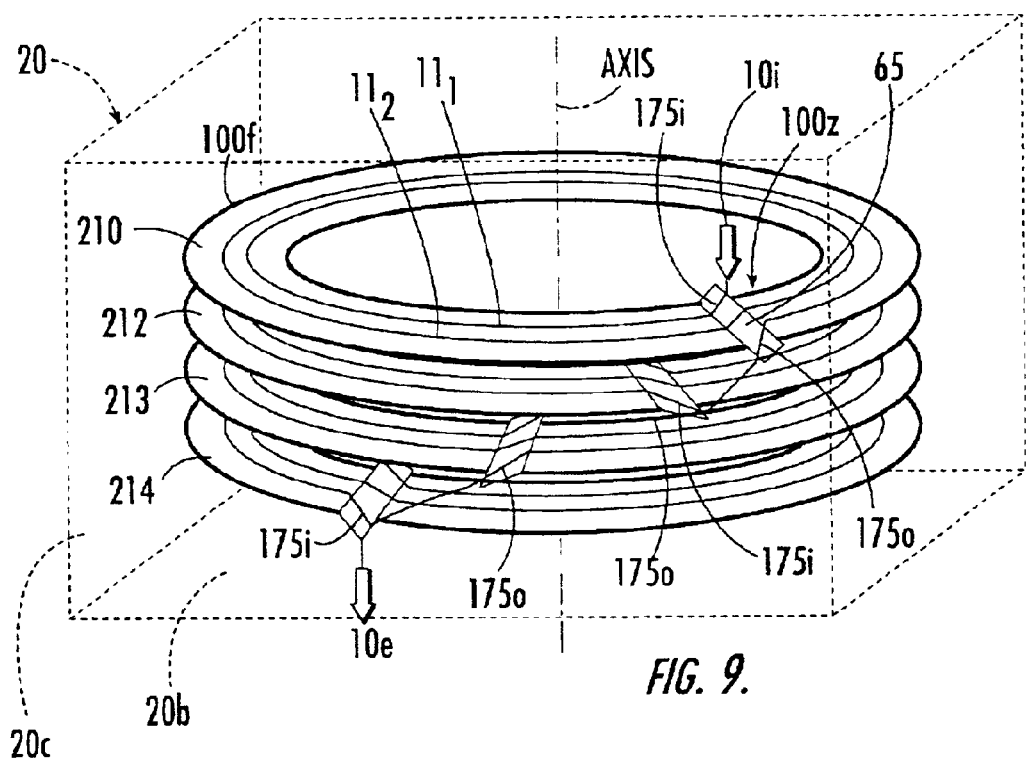
FIG. 9 is a front perspective view of a food processor with stacked tiers according to embodiments of the present invention.

As shown in FIGS. 4B and 5, the walls 66w of the guide channels 66 can be configured to define a portion of the travel path that is angularly offset relative to the respective forward and rearward portions of the travel path or lane. The walls 66w can be disposed in parallel symmetrical angularly offset orientation, from the forward portion of the guide channel 66f to the rearward portion of the guide channel 66r (FIG. 3a) to guide the lateral translation of travel from adjacent lanes. The guide channels 66 may include a ceiling portion (not shown) that, with the opposing sidewalls 66w and underlying conveyor floor 60, define enclosed channel spaces for each of the lateral transition lanes. FIGS. 9 and 7 also illustrate the lateral router guide 65 (without an upstream pick-up assembly 76 or guidewalls 66w).

As shown, the travel lanes 11 are angularly offset relative to the travel direction and the major portion of the travel path in the lateral router guide 65, the angle is defined by the length of the router guide 65 and the amount of lateral translation that occurs relative to the immediately located upstream and downstream portion of the respective travel lane (the travel lane or lanes being generally referred to by element 11, whether in the singular or plural). Thus, the angle of offset defined by the router guide 65 between the upstream to downstream portion of the travel path through the guide channels 66 will typically vary depending on one or more of the amount of lateral translation desired, the length over which it occurs, the type or size of product being processed, and/or the speed at which the translation between lanes occurs. Thus, in operation, the lateral router guide 65 can be configured to simultaneously or concurrently automatically divert the food in each aligned predetermined travel lane to the next at the same place in the travel path.

Figure 6:
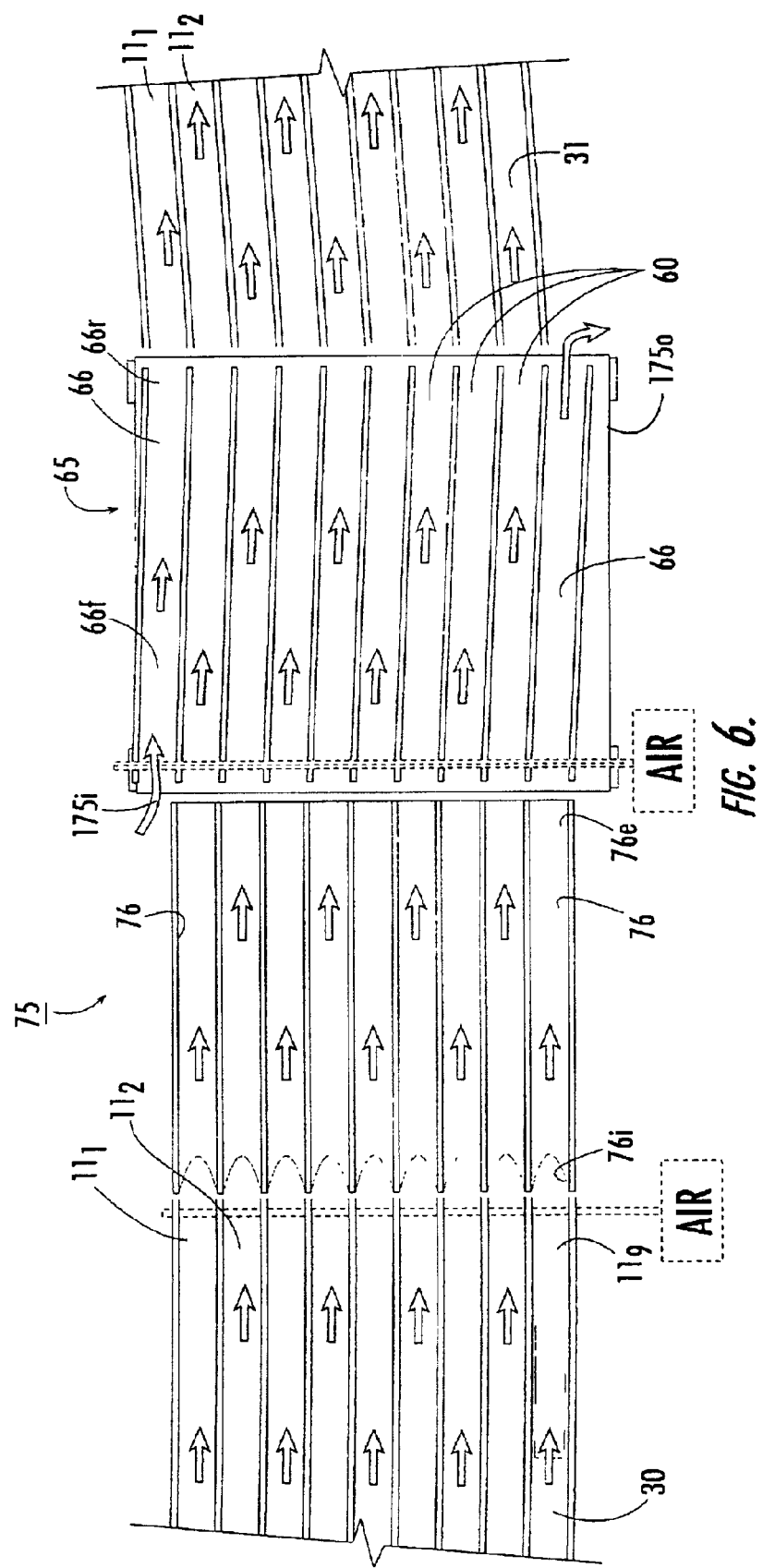
FIG. 6 is a top view of a portion of travel path generally corresponding to that shown in FIG. 3A according to embodiments of the present invention.

As shown in FIG. 3A, after the food exits the respective guide channel 66, it is placed onto another moving floor 31 downstream and proximate the rearward portion of the lateral router guide 65. As is also shown, the diverter conveyor 60c and/or floor 60 of the lateral router guide 65 can be configured so that the food drops or moves down onto the downstream portion of the travel path into the next lane as it exits the rearward (downstream) portion of the respective guide channel 66. Optionally, an air knife located at the rearward portion of the guide channel 66 directing the food downward may also be employed in certain embodiments (FIG. 6).

As shown by the arrow and the single conveyor line in FIG. 3A, a single conveyor can be used so as to extend both upstream and downstream of the router guide assembly 75 and/or the lateral router guide 65 (so that the router guide 75 and lateral router guide 65 overlie the conveyor). However, other designs and arrangements of stationary and/or moving floors may form the upstream and/or downstream portion of the travel lanes as discussed above.

FIG. 5 illustrates one embodiment of a tier having a plurality of side-by-side travel lanes 11 configured to have the food item(s) being processed in the processor complete a plurality of revolutions on the tier 100t, serially progressing to travel over each predetermined lane 11, before exiting the tier 100t. When the food has completed the travel lane progression, it may be diverted onto the next tier. FIG. 9 illustrates this concept. As shown by the dark arrow in FIG. 5, after the food travels lane $11_9$, it is directed through a respective pick-up guide 76 and through the lateral router guide 65 via a corresponding guide channel 66. However, after it exits the guide channel 66, the downstream moving floor 31 is no longer in communication with the food and the food can be allowed to drop or exit 175o to another tier or desired location in the food processing system 10. Similarly, food can be directed to begin its travel on a desired tier 100t by introducing it into the transition region at 175i (such as into one of the outer channel guides) or downstream directly into the location associated with the desired travel lane 11.

FIG. 7 illustrates that the food can start at the innermost edge portion and work to the outermost edge portion on a particular tier. Alternatively, the food can be directed to travel in the reverse direction (outer to inner over adjacent lanes or over spaced-apart lanes). In addition, the food can be directed to travel either longitudinal direction (or clockwise, counterclockwise for endless or round configurations).

FIG. 9 illustrates a vertically stacked multi-tiered food processor with tiers 210, 212, 213, 214 and at least two travel lanes $11_1$, $11_2$ per tier. As shown, in certain embodiments, the order of travel over the lanes alternates over each tier, $11_1$–$11_2$ on the first or upper tier 210 to $11_2$ to $11_1$, on the next underlying tier 212. The stacked tier arrangement is shown with a plurality of longitudinally spaced tiers 210, 212, 213, 214 configured to provide a desired vertical height(s) and residence time in each tier (or, combined, the residence time in the food processor). As used herein, the term "stacked" means that the tiers, shown as elements 210, 212, 213, 214, are positioned as vertically or longitudinally spaced tiers, each tier extending within a certain vertical region of the processor. Each tier defines a portion of the travel path in the processor for the food item and can be any desired shape such as, but not limited to, linear, curvilinear, circular, oval, rectangular, hourglass, or "FIG. 8." The tiers can be arranged such that each tier overlies or underlies the next adjacent tier in the travel path. The travel path is the path that the food travels within a particular tier as it travels in the food processor from the inlet to the outlet. In certain embodiments, each tier or zone (a plurality of selected tiers) can be configured to have an individually controlled environment (as is well known to those of skill in the art) to provide the desired operating environments to provide the desired physical treatments such as moisture or humidity (sprinkling), air velocity, gas exposure, temperature and the like.

In the food processor, the tier 100t can be arranged such that each tier (or a selected group of tiers) is aligned or offset relative to the others, as desired. The height and diameter or width and length of the tier loot can vary, and typically is sized corresponding to the desired residence time in a food processor unit. It is noted that although the travel lanes of FIGS. 5 and 9 are shown as substantially circular tiers with substantially circular travel paths, that is, co-axially arranged with circular and substantially linear planar travel paths in each tier, other shapes of tiers and shapes and orientations of respective travel paths can also be employed as will be discussed further below.

As shown in FIG. 9, the food processor 10 can be configured so that a plurality of tiers 100t are mounted inside a housing 20 (shown in dotted line) which provides an enclosed processing space 20e to protect the food items from external environmental contamination. The food processor 10 can include a food inlet 10i and a food exit 10e. As shown, in operation, the food progresses from a top portion 20u to a bottom portion 20b of the housing 20, but the system can be configured so as to operate in the reverse.

FIG. 6 illustrates a portion of the travel path 100 with the lateral translation region or zone 100z of the tier 100t. The food travels in the direction of the arrows. However, as noted above, food can also be directed to travel in the opposing direction. In any event, as an example for one embodiment of the process, the food can enter at a desired inlet (shown as 175i) and directed to travel in lane $11_1$, the food approaches the translation zone 100z at a first speed on floor 30. In this embodiment, the floor 30 can be a moving floor. The food is then taken into pick-up guide 76 and directed to enter the corresponding guide channel 66 of the lateral router guide 65. The food laterally transitions over a limited longitudinal distance so that, as it exits the guide channel 66, it moves into lane $11_2$. In endless systems, this procedure may be repeated as the food approaches the lateral translation zone 100z in lane $11_2$ so that it is then translated to $11_3$, and so on until the food item travels serially in ordered sequence over each of the travel lanes to exit when it has traveled lane $11_9$ and may exit at 175o. However, as noted above, the food may be a plurality of different or separate items with each being able to be translated concurrently at the transition zone and/or the router guide 65 may be configured to have the food skip over a predetermined number of lanes to its next respective laterally translated travel lane.

The travel lanes 11 may be linear, curvilinear, circular, or other desired shape. Of course, other numbers of lanes 11 (larger or smaller numbers) can be used and different numbers of lanes can be used on different tiers or levels. The lanes do not necessarily need to abut and can be spaced apart as desired, with the router guide 65 and respective guide channels 66 configured to provide the desired amount of lateral translation needed to accommodate the desired lane spacing and translation. The configurations can also be used with a single tier designs as well as with linear systems. In particular embodiments, each tier can have "n" number of separate groupings of lanes, such as 2–6, and each grouping can be termed a "highway". Similarly, each highway can be associated with a plurality or "n" number of lanes, such as 2–10 lanes, and in certain embodiments about 9 lanes.

Figure 8A:
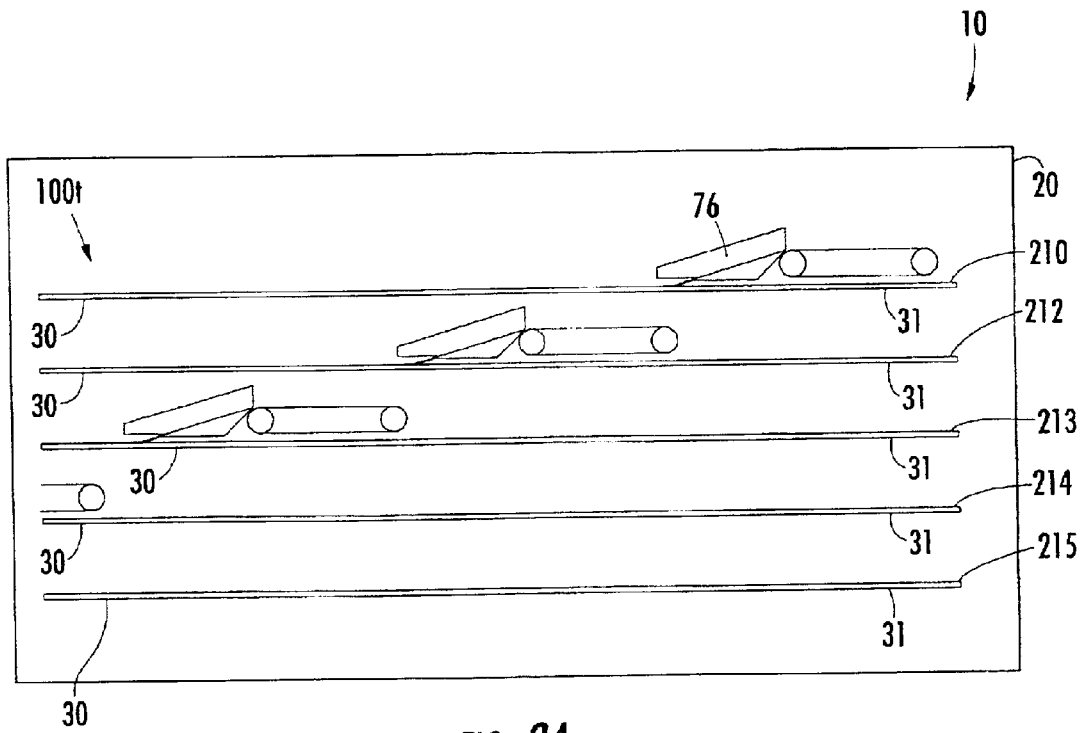
FIG. 8A is a side schematic view of a multi-tier vertically stacked food processing system according to embodiments of the present invention.
Figure 8B:
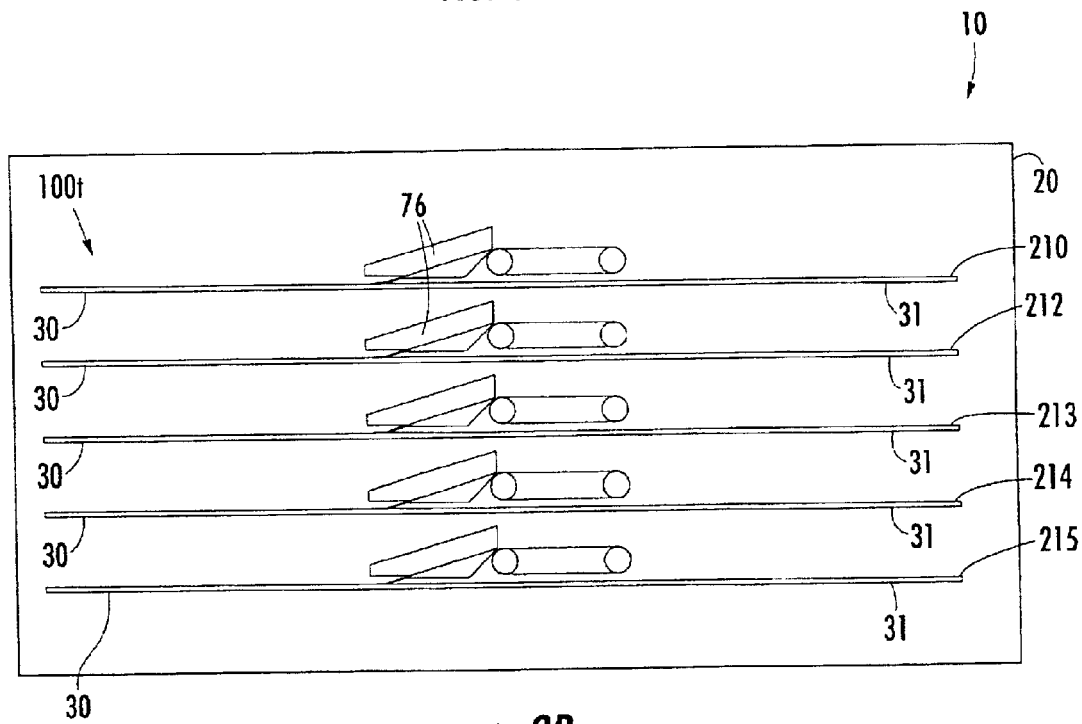
FIG. 8B is a side schematic view of a multi-tier vertically stacked food processing system according to embodiments of the present invention.

FIGS. 8A and 8B illustrate a multi-tier system 210–215 according to other embodiments of the present invention. As shown by FIG. 8B, the tiers 100t may not transfer food between them. Rather, each tier 100t can be configured to operate independently, in pairs, or otherwise as desired. FIG. 8A illustrates that the pick-up 76 and router guides 65 (or transition zones 100z) may be misaligned tier to tier so that the food entry and expel region are spaced apart in the travel path tier to tier.

As is also shown, the present invention is not limited to the guide channel configuration as other lateral translation means can be used to transfer the food items after it moves from an initial travel lane $11_n$ on the first (moving) floor portion 30 and enters and then exits the pick-up guide 76 and travels on the floor 60 and/or diverter conveyor 60c over to the desired next travel lane $11_{n+i}$ on the next downstream (moving) floor 31 so as to cause the food to travel greater than one revolution on a tier. For example, a rod diverter or suspended wedge shaped pointer (not shown), forced air, or, a surface mounted wedge in communication with the diverter conveyor 60c may be able to cause the directional change. Other diversion means can be used as desired as is known by those of skill in the art.

In addition, in certain embodiments, the transfer region 175o, i may be alternatively configured with a positive transfer mechanism such as a ramp, chute, forced air, or vacuum or other conveyance structure to help direct or move the food to the next tier (above, below, or laterally spaced tier).

Figure 10:
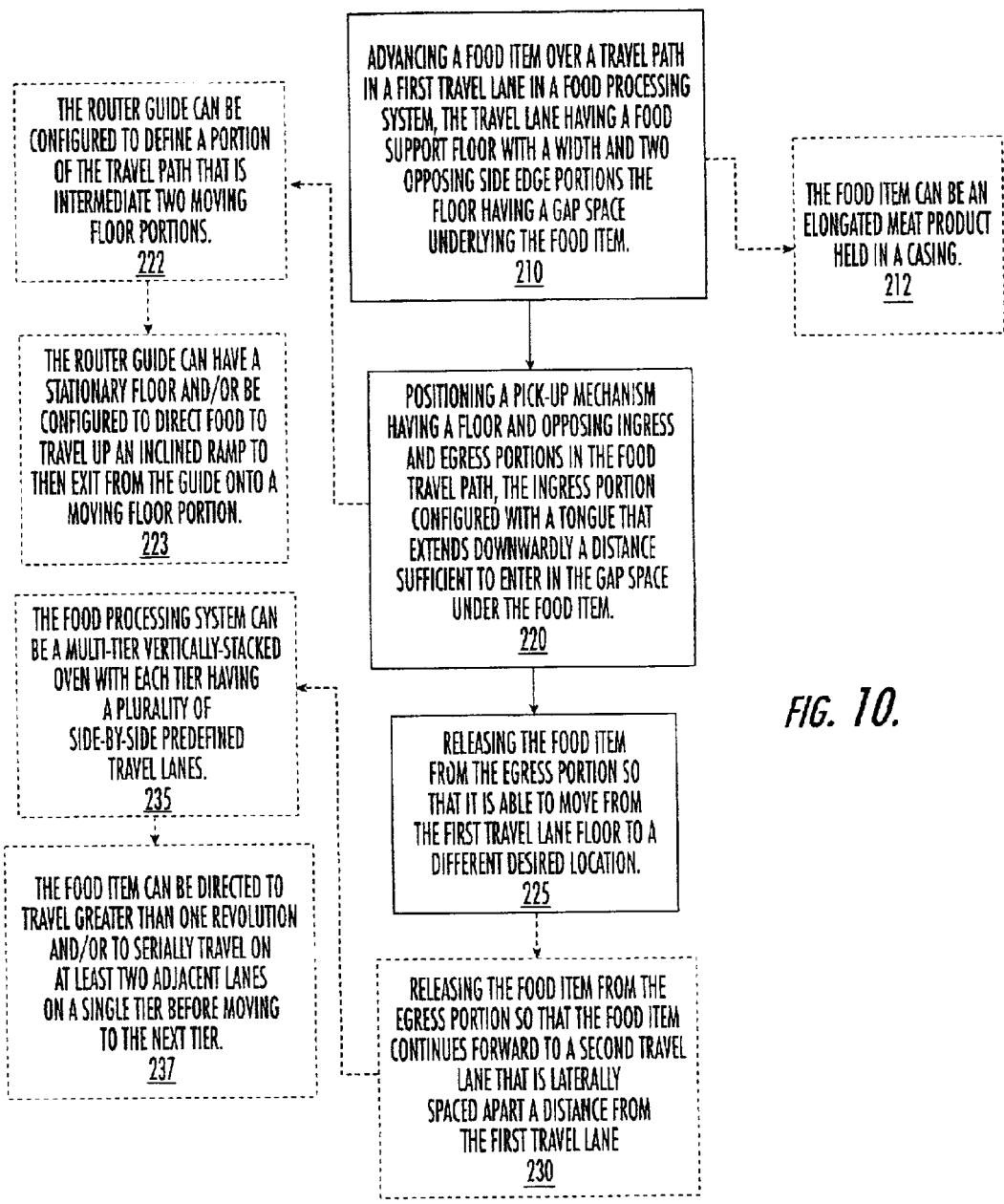
FIG. 10 is a block diagram of operations for routing food through a portion of a food processor according to alternate embodiments of the present invention.

FIG. 10 illustrates a series of operations according to other embodiments of the present invention. The food item is advanced over a first travel lane in a food processing system similar to the description above. The travel lane has a floor configured with two opposing side edge portions separated by a gap space having an associated width and depth (block 210). In certain embodiments, the gap space width can be greater than about 20–50% (or a major portion)

of the width of the food item In position, the food item spans the gap space and rests against the two opposing side edge portions above the underlying gap space. The food item can be an elongated meat product in a casing (block 212). The food is directed to travel through a pick-up mechanism having a floor and opposing ingress and egress portions, the ingress portion can be configured with a tongue or finger that extends downwardly a distance sufficient to enter or reside in the gap space (block 220). The pick-up mechanism may be configured to repetitively retract and enter from and to the gap space in concert with the engagement of a floor holding a meat product thereon. In other embodiments, as before, the pick-up mechanism can be configured to define a portion of the travel path that is in the stream of travel such as intermediate two moving floor portions (block 222).

The food item is released from the egress portion so that it is directed to a next desired location. In certain embodiments, the food exits the egress portion and automatically continues moving along a desired travel path (block 225). As for the embodiment above, the food item can be released to a second travel lane that is laterally spaced apart a distance from the first travel lane (block 230).

Similar to the embodiments discussed above, the pick-up mechanism can have a stationary floor or moving floor or portions of each and/or be configured to direct food to receive food from an upstream first moving floor. In operation, the tongue of the pick-up mechanism enters the gap space and engages with the food product to dislodge or direct the food to travel up an inclined ramp, exit from the egress portion of the pick-up mechanism, and travel onto the next downstream moving floor (block 223). The food processing system can be a multi-tier vertically stacked oven with each tier providing a plurality of predetermined side-by-side travel lanes (block 235). The food item can be directed to travel greater than one revolution, traveling over at least two adjacent lanes on a selected tier, before moving to the next tier (block 237).

Figure 11:
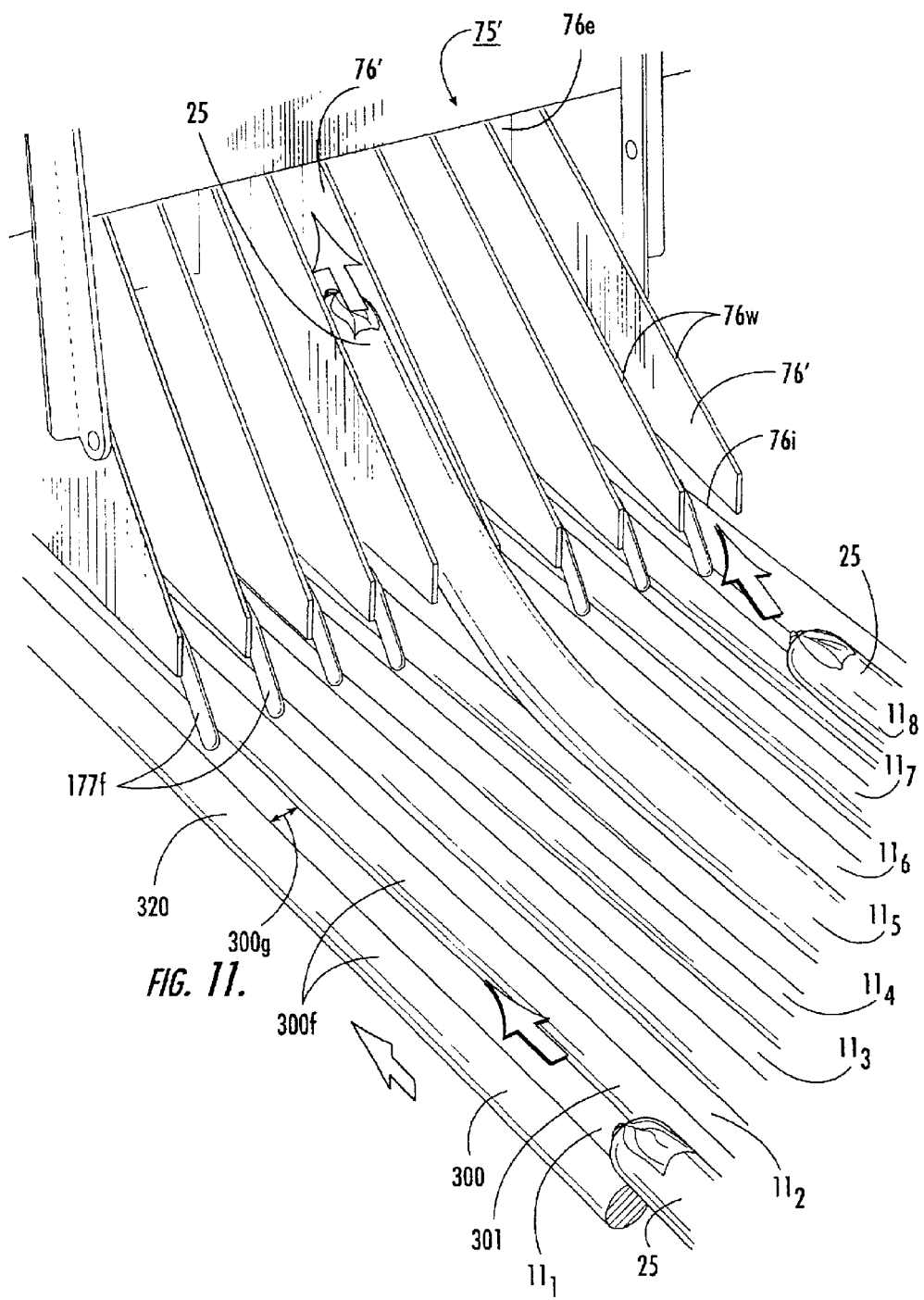
FIG. 11 is a side perspective view of a portion of a food travel path with pick-up/transfer mechanism in systems having a floor with a gap space underlying a portion of the width of the food product according to embodiments of the present invention.

Turning now to FIG. 11, a portion of a travel path 100 having a gap space 320g configured to receive a tongue 177f of a pick-up mechanism 76' is shown. The tongue 177f enters the gap space 320g and directs the food off the floor of the travel path 11n. The tongue 177f may help dislodge foods that are attached or stuck to the underlying surface in certain embodiments. As such, the floors 300f, 320f that carry or support the food are configured with a gap space 320g that is continuous in the direction in which the tongue 177f enters the floor.

In the embodiment shown in FIG. 11, the travel lanes $11_1$–$11_8$, have floors 300f that are configured to define a gap space 320g that has a width $W_1$ (FIG. 12). In particular embodiments, the width $W_1$ may be selected so as to be greater than about 20–50% the width of the food item $W_2$ (FIG. 12) that travels thereon. In certain embodiments, the product may have a width of between about 0.5–2 inches, and the gap space 320g can be sized with a width that is between about 0.25–1 inches. The gap space 320g may have a depth of any suitable size. In certain embodiments, the depth is at least about 0.5 inches.

FIG. 11 illustrates that the lanes 11 can be defined by pairs of spaced-apart elongated rods 300, 301 (as shown, these two rods 300, 301 define lane $11_1$). Other embodiments can employ laterally spaced-apart cooperating rollers or other suitable structures (not shown). In any event, the spaced-apart rods, rollers, or other structures can define the travel lane(s) 11. In operation, the food 25 resides above the gap space 320g (320g, FIGS. 14A, 14B). FIGS. 12 and 13 illustrate that the pairs of rods can be configured so that each lane $11_1$, $11_2$ has its own corresponding pair of rods 300, 301 and 302, 303, respectively (FIG. 13), or so that adjacent lanes $11_1$, $11_2$ share one of the rods, 300, 301 and 301, 302. In operation, the rods 300 et seq. can be configured to advance in a desired rate of speed to form the moving floor 320f so as to advance the food 25 item along the travel path 100. In particular embodiments, two stainless steel rods 300, 301 define a travel floor or lane and the rods may have about a ⅝ inch outer diameter and be spaced apart a distance so that there is about 0.5–1 inch between centers. In certain embodiments, about a ⅝ inch cross-sectional area meat product nests therein such as shown in FIG. 12. The spacing and size may vary depending on the product size and density and the like.

FIG. 14A illustrates an alternate configuration of a moving floor 320f with a gap space 320g. In this embodiment, a conveyor can be used to define one or more travel lanes 11 (or a portion of same) (shown as a single lane $11_1$). The conveyor itself can be configured with a channeled floor surface 320f that provides the gap space 320g. The gap space 320g can be located centrally (or offset, FIG. 14) in the lane 11 below the food 25. The gap space 320g opens into or is in communication with the upper portion of the floor 320u upon which the food 25 rests. As shown in FIG. 14A, the upper portion of the floor 320u can have an aperture with a width $W_3$ that is larger than the width of the food $W_1$ and is sized and shaped to receive a portion of the food item therein so that the food 25 item resides above the gap space 320g. In so doing, the food item 25 can be supported by a reduced area physical contact portions $320c_1$, $320c_2$ on opposing side edge 320e contact portions of the floor 320f. At the contact locations $320c_1$, $320c_2$, the width of the aperture $W_4$ can be greater than about 50% of the width of the food item 25. In the embodiment shown in FIG. 14A, when viewed from the front, the floor aperture width narrows from top to bottom to hold the food item 25 suspended above the underlying gap space 320g. As such, the sidewalls 320w of the travel lane 11 can be configured to angularly extend between the top surface of the floor 320u and the top portion of the gap space 320g. In certain embodiments, the gap space 320g can be configured as a rectangular channel. Other shapes and sizes can also be used.

FIG. 14B illustrates an alternate configuration of a conveyor floor 320f having the gap space 320g formed directly under the upper portion of the floor 320u. The upper portion of the floor 320u may be a planar support surface. Ridges, valleys, or other axially extending lane guides may also be used (not shown). The width of the gap space 320g may be selected to correspond to the width of the food 25 as desired to form a sufficient support surface to inhibit deformation of the product as it travels on the conveyor. In certain embodiments, suitable gap widths may be widths that are between about 10–80% of the width of the product 25.

FIG. 14D illustrates yet another embodiment of a floor 300f similar to that shown in FIG. 11. As shown, the food 25 travels on a surface defined by two elongated spaced apart rods 300, 301 and a centrally located smaller rod 302. The gag space 320g can be either one, or both, of the regions between the rods 300 and 302 or 302 and 301. FIG. 14E shows an additional embodiment where the food product 25 overlies a plurality of gap spaces 320g. In operation, the tongue 177f (FIG. 11) of the pick-up mechanism 76' (FIG. 11) may enter any or a plurality of the gap spaces 320g to cause the food to travel through the pick-up mechanism and/or to dislodge, pull, push, scoop, scrape, or otherwise manipulate the food 25 from the floor 300f.

Referring again to FIG. 11, the floor 300f can be employed in food processing systems 10 that advances or carries food 25 through different environmental conditions. As before, a router guide assembly 75' may be used with a plurality of pick-up guides or mechanisms 76', typically one for each travel lane $11_1$–$11_n$. The pick-up mechanism 76' can dislodge the food from its resting or upstream travel surface, receive the food 25, and direct it upwardly (or downwardly, not shown) through the pick-up mechanism 76'.

The pick-up mechanism 76' can be used to alter or transition the travel path for the food in a particular travel lane 11 to change from a first path to a higher, lower, longitudinally, or laterally offset second path. The location in the travel path that carries out the directional change can be described as a transition zone 100z (FIG. 15A, 15B). As shown in FIG. 11, looking at lane $11_5$, as the food product 25 advances toward the transition zone, it approaches the ingress portion 76i of the router guide, then enters and climbs the pick-up guide or mechanism 76', and exits the egress portion of the pick-up guide 76e.

The pick-up mechanism 76' may also be configured to be dynamically operated to extend and retract from a side or upward or downwardly mounted position (relative to the food and its carrier floor) to move dislodge or contact food held on a stationary floor.

FIGS. 11, 15A and 15B illustrate that the pick-up guide 76' includes a forward member 177f that can be described as a downwardly extending protruding tongue or finger. The forward member 177f is sized and configured to enter the gap space 320g. It may be centrally located with respect to the corresponding travel lane 11, or offset relative thereto, with a length that is sufficient to position a portion of the forward member 177f a distance into the gap space 320g. As shown in FIG. 15A, the forward member 177f is located proximate to and typically below the level of the food as the food 25 approaches the pick-up guide 76'. In certain embodiments, the forward member 177f at a stationary vertical distance "D" into the gap space 320g, as shown, in position, the forward member 177f is proximate to, but resides below, the floor surface level (below or under the food). Of course the forward member 177f can be configured to extend downwardly greater distances into the gap space 320g as desired, such as below the level of the rods, where used. The angle of incline (or decline) of the forward member 177f can be selected so as to inhibit the disruption of the food as the food 25 transfers from the moving floor to travel over the forward member. Typically, the angle of incline will depend on the size and/or weight of the product, the speed of the moving floor 300f, 320f, and the like. The angle of incline for the forward member 177f and/or the ramp 76r can be any desired angle, typically under about 90 degrees. In certain embodiments the angle can be about 10–80 degrees, and in particular embodiments about 20–70 degrees. In some embodiments, the angle of both or one of the forward member 177f and/or the ramp portion 76r (FIG. 16B) is about 45 degrees. As before, the floor of the forward member 177f or floor of the ramp portion 76r can be stationary (formed of a rod, plate, or other static structure) or may include conveyors, rollers, bearings, or other suitable flooring components.

In operation, as shown in FIGS. 15A and 15B, the food 25 can straddle or overlie the underlying gap space 320g and is then directed to contact and climb the forward member 177f. For automated continuous movement systems such an action can be carried out in a manner that inhibits the disruption of the continuous automated (forward) movement. As before, the forward member 177f and/or the floor of the pick-up guide 76f may be stationary and the food propelled partially or wholly by its forward momentum. The forward member 177f may be configured from stainless steel or other desired material (coated or uncoated as noted above). This embodiment may reduce the friction or interference of the movement at the junction of the pick-up guide 76' and the floor 300f, 320f. Air may again be optionally used at desired locations along the transfer zone to help direct the food as described above.

Figure 16A:
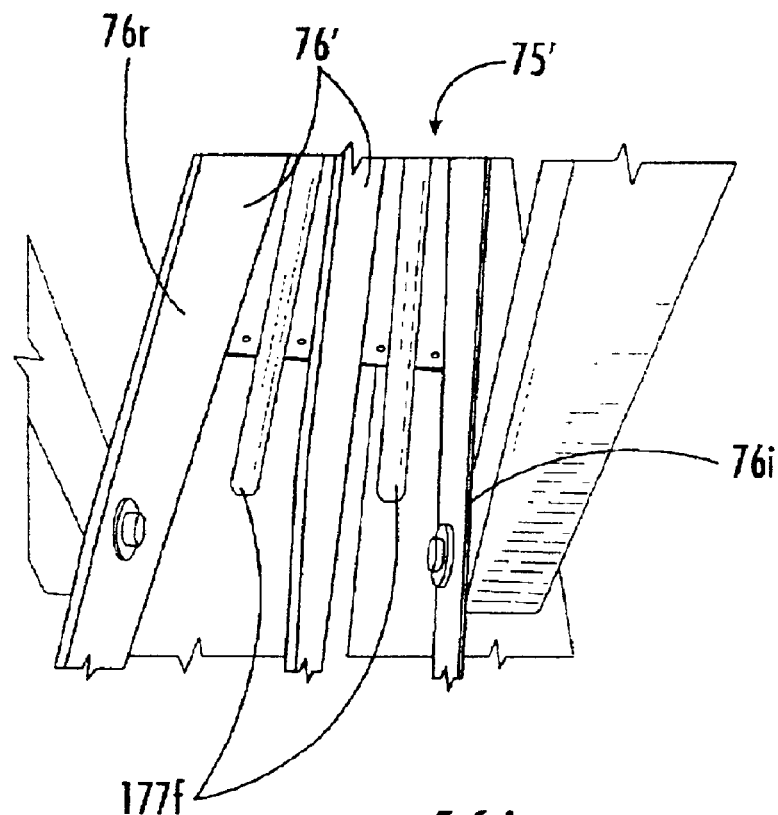
FIG. 16A is a perspective view of a router guide assembly suitable for use with a gap space floor according to embodiments of the present invention.
Figure 16B:
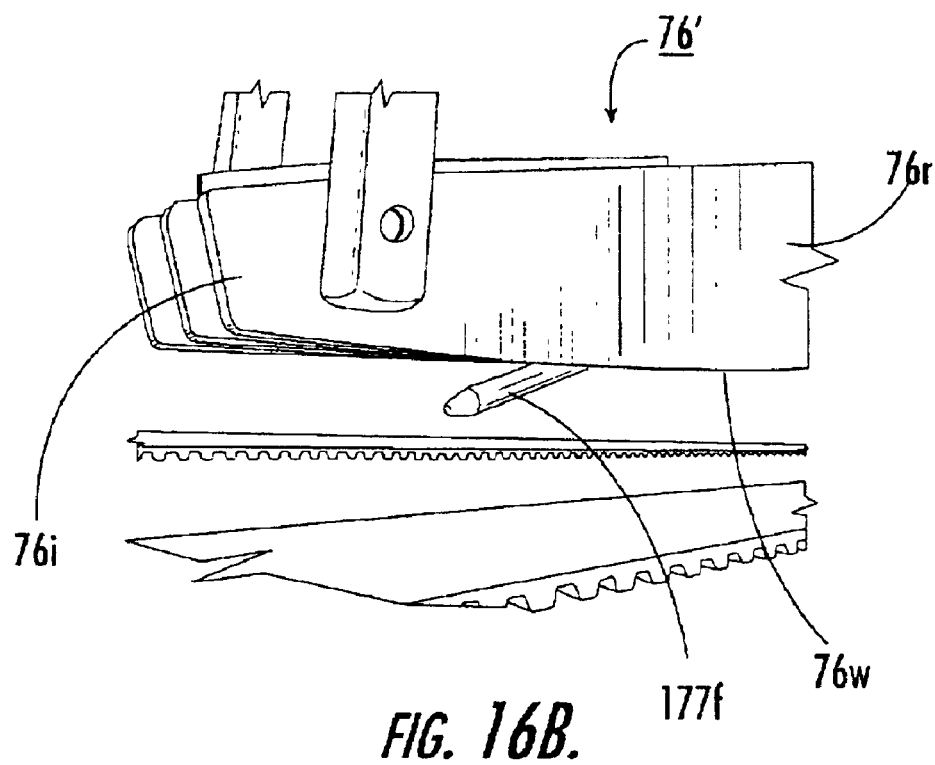
FIG. 16B is a side view of the device shown in FIG. 16A.

FIGS. 16A and 16B illustrate certain embodiments of the pick-up guide 76' with the downwardly extending forward member 177f and the sidewalls 76w that help retain the food in its intended lane (and without the upstream moving floor). The sidewalls 76w may not be required in certain embodiments, such as in low speed applications (under about 1 ft/sec.) or where the size, weight or adhesiveness of the product helps maintain the product in its desired lane or region.

In certain embodiments, the system 10 can be configured such that the food 25 moves more than one revolution on a moving floor that can be configured from rollers, rods, or single or multiple conveyors (i.e., the conveyor may be looped or have multiple tracks thereon so as to define more than one perimeter travel path) before moving to a second conveyor or the next tier. In other embodiments, a plurality of cooperating conveyors are used on each tier to define the perimeter paths, Combinations of each of these moving floor configurations are also contemplated. Each travel path may include both stationary and moving floor portions. The moving floor portions may be set to move at the same or dissimilar speeds as desired. For example, the upstream floor (relative to the pick-up guide 76, 76' and/or router guide 65 may operate at about 5 ft/sec. The pick-up guide floor 76f and the router guide floor 60 may both operate under this speed (such as at 0 speed), and the downstream floor may operate similarly at 5 ft/sec. In other embodiments, the pick-up mechanism moves forward at a speed greater than the support floor. It is the difference in speed and/or directional movement between the food on the support floor holding the food and the pick-up mechanism 76, 76' (i.e., >0 absolute velocity between these components) either in the line of product flow, against, or to the side of direction of the product line of flow, that can dislodge and propel the food from the support floor.

FIG. 9 also illustrates that the transfer regions 175o may be defined as open spaces that allow the food to drop (via gravity) down to the next level or as chutes, conveyors or other transfer means.

In particular embodiments, the lanes 11 can be configured or formed using one conveyor having a sufficient width to provide the number of lanes, or by using at least two (two or more) side-by-side cooperating conveyors. The conveyors "cooperate" in that they are configured to be in communication and operate together to either hand off or receive food from the other conveyor so that the food serially (directly or indirectly) travels first on one then on the other. The cooperating conveyors can be configured as side-by-side and/or in-line conveyor arrangements. Of course other combinations of conveyors (such as side-by-side alone, in-line alone, or other quantities or shapes of conveyors arranged to define the travel path and/or lanes) can also be used. Additionally, two or more sets of cooperating conveyors can be used to concurrently process different food items (or strands or sets of items) about the same tier (not shown). See U.S. patent application Ser. No. 09/888,925 to Shefet et al. for additional description of conveyor configurations, the contents of which are hereby incorporated by reference as if recited in full herein.

The speed of the conveyor(s) used to form one or more of the moving floors for the travel lanes 11 including those described above, 30, 31, 60, 300f, 320f, can be set to match the desired residence time according to the time desired in each tier. In certain embodiments, the oven can be configured with a height of between about 20–40 feet with a length of between about 60–400 feet and a width of between about 20–100 feet running an elongated meat product at about 5–6.5 fps (feet per second). Of course, the processors or ovens of the present invention are not limited thereto, as any desired profile (height×width×depth) can be used depending on the floor space and ceiling limitations and the capacity or processing (time) requirements. In certain embodiments, the food processor 10 can include an oven and can be configured to throughput at least about 5,000–23,000 feet per hour of a food item, typically an elongated meat product, during a desired period.

The conveyors on each tier or between tiers can be operated or adjusted so as to run at the same or different conveyor speeds. In certain embodiments, the processor 10 can be configured to concurrently process a plurality of elongated strands (such as, but not limited to, about 4–50 strands). In certain embodiments, about seven to fourteen separate strands of elongated continuous food product can be introduced into the food inlet and onto the upper tier. In so doing, the surface of the lanes 11 can include holding grooves or guides to help position the strands side-by-side on the respective travel paths in each tier. As such, each travel lane shown in FIG. 1 and/or FIG. 11 can hold a discrete strand of food product or the strand may have a length such that it covers more than one lane during processing which travel concurrently serially about each of the lanes to make the desired number of revolutions at each tier.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for routing food in a food processing system having a plurality of side-by-side predetermined travel lanes, comprising:

advancing a food item over a first travel lane in the food processing system, the food processing system having a plurality of side-by-side travel lanes in a tier, a plurality of the travel lanes having a respective lateral router guide associated therewith; then directing the food item through a first lateral router guide having a floor and opposing ingress and egress portions in the tier, then releasing the food item from the egress portion of the first lateral router guide so that the food item continues forward to a second travel lane that is laterally spaced apart a distance from the first travel lane in the tier; then directing the food item through a second lateral router guide having a floor and opposing ingress and egress portions in the tier; and then releasing the food item from the egress portion of the second lateral router guide so that the food item continues forward to a third travel lane that is laterally spaced apart a distance from the first and second travel lanes in the tier whereby the food item travels over a plurality of travel lanes and greater than one revolution in the tier.

2. A method according to claim 1, wherein the lateral router guide defines a minor portion of the travel distance of the food item in a travel lane, wherein the lateral router guide is located in the line of travel of the food item, between an upstream and downstream portion of the food's line of travel, end wherein the advancing step is carried out by conveying the food item using at least one conveyor with an associated conveyor speed to direct the food item to enter the lateral router guide ingress portion, wherein the lateral router guide remains in a fixed position in the food processor during the directing steps, and wherein each of the side-by-side travel lanes have generally the same length.

3. A method according to claim 2, wherein the food item is an elongated food item, wherein the router guide comprises a stationary floor, and wherein the directing step comprises:

receiving the elongated food item into the ingress portion of the router guide; and advancing the elongated food item over the stationary floor of the lateral router guide and out the egress portion of the router guide at least partially responsive to the forward momentum generated by the conveying speed generated upstream thereof.

4. A method according to claim 2, wherein the food item is an elongated food item, wherein the router guide comprises a moving floor, and wherein the directing step comprises:

receiving the elongated food item into the ingress portion of the router guide; and advancing the elongated food item over the moving floor of the lateral router guide and out the egress portion of the router guide at least partially responsive to the speed of the moving floor of the router guide.

5. A method according to claim 1, wherein the directing step comprises conveying the food item over a diverter conveyor that defines the floor of the lateral router guide, the diverter conveyor providing angularly offset travel paths thereon so as to cause the food to alter its travel direction from the first travel lane to a second laterally offset travel lane as the food travels the length of the diverter conveyor.

6. A method according to claim 1, wherein the food item is an elongated food item.

7. A method according to claim 1, wherein the advancing step is carried out using a food support floor that defines a gap space that is configured to underlie the food item.

8. A method according to claim 1, wherein the first, second and third travel lanes are configured to direct the food item to travel greater than 2 revolutions in a respective tier and have generally the same length with substantially the same environmental conditions.

9. A method for routing food in a food processing system having a plurality of side-by-side predetermined travel lanes, comprising:

advancing a food item over a first travel lane in the food processing system; then directing the food item through a lateral router guide having a floor and opposing ingress and egress portions; and then releasing the food item from the egress portion so that the food item continues forward to a second travel lane that is laterally spaced apart a distance from the first travel lane; and a pick-up guide with a ramp portion having a floor and upwardly extending sidewalls and a downwardly angled protruding member positioned in a first end portion of the pick-up guide in advance of the ramp portion, the protruding member positioned so that it resides upstream of the ramp portion relative to the direction of travel of the food, wherein the pick-up guide is in cooperating communication with the lateral router guide, and wherein, in operation, the pick-up guide contacts the food and directs the food to travel up the ramp portion thereof and into the lateral router guide.

10. A method according to claim 9, wherein the lateral router guide comprises a plurality of separate guide channels sharing a common diverter conveyor floor, each guide channel having a pair of upwardly extending sidewalls that overlie the diverter conveyor floor, wherein, in operation, the router guide defines a plurality of laterally angled travel lanes in the travel path so as to controllably direct the food item to change its lateral travel orientation from the first upstream lane to the second downstream travel lane.

11. A method according to claim 9, wherein the router guide comprises a stationary floor that underlies a plurality of separate guide channels, each guide channel having a pair of upwardly extending sidewalls that overlie the floor, wherein, in operation, the router guide defines a plurality of laterally angled travel lanes iii the travel path so as to controllably direct the food item to change its lateral travel orientation from the first to the second travel lane.

12. A method according to claim 9, further comprising directing a gas to flow upwardly from the floor of the pick-up and/or lateral router guide to inhibit food adhesion thereto.

13. A method according to claim 9, wherein the pick-up guide protruding member comprises a planar edge portion with a forked leading edge having two opposing side portions and central gap space therebetween.

14. A method according to claim 13, wherein the central gap space angularly narrows in the direction of travel toward the egress portion of the stationary router guide.

15. A method for routing food in a food processing system having a plurality of side-by-side predetermined travel lanes, comprising:

advancing a food item over a first travel lane in the food processing system; then directing the food item through a lateral router guide having a floor and opposing ingress and egress portions; and then releasing the food item from the egress portion so that the food item continues forward to a second travel lane that is laterally spaced apart a distance from the first travel lane, wherein the advancing and directing steps comprise causing the food item to travel serially from an upstream floor being disposed at a first height, into a pick-up guide that directs the food item to travel upwardly over an inclined ramp portion associated therewith to then enter the ingress portion of the router guide to exit at the egress portion thereof, and wherein the food item exits the egress portion of the router guide at a height that is greater than the height of the upstream floor.

16. A method for routing food in food processing system having a plurality of side-by-side predetermined travel lanes, comprises:

advancing a food item over a first travel lane in the food processing system; then directing the food item through a lateral router guide having a floor and opposing ingress and egress portions;

directing a gas to flow downwardly over the food proximate the ingress portion of the router guide to assist in directing the food item off the floor of the pick-up guide onto the floor of the lateral router guide; and then releasing the food item from the egress portion so that the food item continues forward to a second travel lane that is laterally spaced apart a distance from the first travel lane.

17. A method for routing food in a food processing system having a plurality of side-by-side predetermined travel lanes, comprising:

advancing a food item over a first travel lane in the food processing system, wherein the advancing step is carried out using a food support floor that defines a gap space that is configured to underlie the food item;

positioning a pick-up mechanism having an outwardly extending protruding finger so as to be in operative communication with the food support floor;

inserting the finger of the pick up finger into the floor gap space of the food support floor under the food item thereby causing the food to alter at least one of its travel position on the food support floor, its travel direction, or its travel altitude; then directing the food item through a lateral router guide having a floor and opposing ingress and egress portions; then releasing the food item from the egress portion so that the food item continues forward to a second travel lane that is laterally spaced apart a distance from the first travel lane.

18. A method according to claim 17, wherein the inserting and positioning steps are carried out in an automated marinner to semi-continuously or continuously direct the food to leave from the food support floor and travel into the pick-up mechanism.

19. A method according to claim 17, wherein the food is at least partially stuck to or attached to the food support floor, and wherein in response to the step of inserting the finger into the gap space, the food is dislodged from the food support floor.

20. A method according to claim 17, wherein the food support floor is a moving floor, and wherein, in operation, the food item automatically travels first onto the protruding forward member of the pick-up guide and then enters the router guide.

21. A method according to claim 17, wherein the food support floor is a stationary floor, and wherein, in operation, the food item automatically travels first onto the protruding forward member of the pick-up guide and then enters the router guide.

22. A method for routing food in a food processing system having a plurality of side-by-side predetermined travel lanes, comprising:

advancing a food item over a first travel lane in the food processing system, wherein the advancing step is carried out using a food support floor that defines a gap source that is configured to underlie the food item, and wherein the food support floor is defined by a conveyor that is configured with a upper floor portion having an aperture formed therein that opens to an underlying gap space, wherein the food item spans the upper floor portion aperture and resides above the gap space; then directing the food item through a lateral router guide having a floor and opposing ingress and egress portions; and then releasing the food item from the egress portion so that the food item continues forward to a second travel lane that is laterally spaced apart a distance from the first travel lane.

23. A method for routing food in a food processing system having a plurality of side-by-side predetermined travel lanes, comprising:

advancing a food item over a first travel lane in the food processing system; then directing the food item through a lateral router guide having a floor and opposing ingress and egress portions; and then releasing the food item from the egress portion so that the food item continues forward to a second travel lane that is laterally spaced apart a distance from the first travel lane, wherein the food item is an elongated food item that has a continuous length of at least about 20 feet.

24. A method for routing food in a food processing system having a plurality of side-by-side predetermined travel lanes, comprising:

advancing a food item over a first travel lane in the food processing system, wherein the advancing step is carried out using a food support floor that defines a gap space that is configured to underlie the food item, and wherein the food support floor is configured to move along the travel path in the direction of travel and is defined by a corresponding pair of spaced-apart elongated rods; then directing the food item through a lateral router guide having a floor and opposing ingress and egress portions; and then releasing the food item from the egress portion so that the food item continues forward to a second travel lane that is laterally spaced apart a distance from the first travel lane.

* * * * *

UNITED STATES PATENT AND TRADEMARK OFFICE
CERTIFICATE OF CORRECTION

PATENT NO. : 6,793,068 B2 Page 1 of 1
DATED : September 21, 2004
INVENTOR(S) : Shefet et al.

It is certified that error appears in the above-identified patent and that said Letters Patent is hereby corrected as shown below:

<u>Column 23,</u>
Line 2, should read -- space that is configured to underlie the food item, and --

Signed and Sealed this

Eighth Day of February, 2005

JON W. DUDAS
*Director of the United States Patent and Trademark Office*